(12) United States Patent
Vogel et al.

(10) Patent No.: US 7,697,127 B2
(45) Date of Patent: Apr. 13, 2010

(54) METHOD AND SYSTEM FOR ANGLE MEASUREMENT

(75) Inventors: Michael Vogel, Schleifreisen (DE); Andreas Glimm, Weimar (DE)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/233,045

(22) Filed: Sep. 18, 2008

(65) Prior Publication Data

US 2009/0231574 A1 Sep. 17, 2009

Related U.S. Application Data

(63) Continuation-in-part of application No. PCT/EP2008/052179, filed on Feb. 22, 2008.

(51) Int. Cl.
*G01B 11/26* (2006.01)
(52) U.S. Cl. .................................................. 356/154
(58) Field of Classification Search ................. 356/154
See application file for complete search history.

(56) References Cited

U.S. PATENT DOCUMENTS

| | | | |
|---|---|---|---|
| 4,518,859 A | 5/1985 | Hoshika | |
| 5,196,900 A * | 3/1993 | Pettersen | 356/141.4 |
| 5,428,217 A | 6/1995 | Nakajima et al. | |
| 7,034,282 B2 | 4/2006 | Oka et al. | |
| 7,041,961 B2 | 5/2006 | Siraky | |
| 7,123,354 B2 | 10/2006 | Burgschat et al. | |
| 7,145,131 B2 * | 12/2006 | Mizuno et al. | 250/231.18 |
| 2005/0072912 A1 | 4/2005 | Mizuno et al. | |

2006/0243895 A1  11/2006  Nordenfelt et al.

FOREIGN PATENT DOCUMENTS

| | | |
|---|---|---|
| CA | 2196617 | 8/1998 |
| DE | 3831417 | 3/1990 |
| DE | 4331647 | 3/1995 |
| DE | 4340417 C2 | 12/2001 |
| DE | 202004008829 U1 | 9/2004 |

(Continued)

OTHER PUBLICATIONS

International Search Report and Written Opinion of PCT Application No. PCT/EP2008/052179, mailed Apr. 6, 2009, 11 pages.

*Primary Examiner*—Roy Punnoose
(74) *Attorney, Agent, or Firm*—Townsend and Townsend and Crew LLP

(57) ABSTRACT

An angle measurement device includes a light source configured to emit light along an optical path and a patterned member positioned along the optical path and configured to rotate about an axis of rotation. The patterned member includes a periodic optical variation. Light passing through the patterned member provides a spatially modulated optical waveform. The angle measurement device also includes an imaging device positioned along the optical path and including a plurality of photosensitive elements disposed in an array configuration. The imaging device is configured to receive the spatially modulated optical waveform and provide a signal associated with light intensity at each of the plurality of photosensitive elements. The angle measurement device further includes an angle determination unit coupled to the imaging device and configured to compute a rotation angle of the patterned member based on a reference waveform and the provided signal.

37 Claims, 15 Drawing Sheets

FOREIGN PATENT DOCUMENTS

| | | |
|---|---|---|
| DE | 102004019332 | 11/2004 |
| DE | 102004001996 | 8/2005 |
| DE | 102004011146 | 8/2005 |
| EP | 0 072 549 | 2/1983 |
| EP | 0 276 402 | 8/1988 |
| EP | 1 452 836 | 9/2004 |
| JP | 09-076471 | 3/1997 |
| WO | WO 97/37368 | 10/1997 |
| WO | WO 00/36377 | 6/2000 |
| WO | WO 2005/047824 | 5/2005 |
| WO | WO 2008/019855 A1 | 8/2008 |

* cited by examiner

METHOD AND SYSTEM FOR ANGLE MEASUREMENT

CROSS-REFERENCES TO RELATED APPLICATIONS

This application is a continuation-in-part of commonly-owned, co-pending PCT Patent Application No. PCT/EP2008/052179, filed Feb. 22, 2008 entitled "Absolute Angle Encoder," the entire disclosure of which is hereby incorporated by reference.

BACKGROUND OF THE INVENTION

The present invention relates generally to a method and system for measuring angles. Merely by way of example, the invention has been applied to an angle measurement device useful for determining a rotation angle. In a particular embodiment, a system for measuring rotation angles is utilized in a surveying instrument. However, embodiments of the present invention are not limited to this particular application and may be utilized in a variety of measurement systems.

Angle encoders, such as absolute and incremental angle encoders, have been employed for angular measurements in machine tools, drive technology, automotive electronics, and the like. An example of an angle encoder is a rotating disk used in conjunction with a reading head that is able to detect rotation of the disk. In a particular example of a conventional angle encoder, a light source (e.g., an LED) illuminates a partially transparent disk upon which an opaque pattern fixed to the rotating mechanical element is superimposed. A photodetector (e.g., a photodiode) is positioned on the opposite side of the disk and fixed to the stationary mechanical element. Light passing through the partially transparent disk is modulated by the opaque pattern and, as the angular displacement of the disk changes, the light modulation of the pattern will be detected by the photodetector, thereby providing a measure of angular rotation of the disk.

An angle encoder is described in U.S. Patent Application Publication No. 2005/0072912. In this angle encoder, a rotating plate with two openings for light transmission is mounted between two light sources and a two-dimensional profile sensor. Based on a correlation between a first position associated with light from the first light source and a second position associated with light from the second light source, an absolute value of the rotation angle is calculated. However, this device provides limited angular resolution.

Thus, there is a need in the art for improved methods and systems for measuring angle, for example, rotation angles.

SUMMARY OF THE INVENTION

According to an embodiment of the present invention, an angle measurement device is provided. The angle measurement device includes a light source configured to emit light along an optical path and a patterned member positioned along the optical path and configured to rotate about an axis of rotation. The light passing through the patterned member provides a spatially modulated optical waveform. The angle measurement device also includes an imaging device positioned along the optical path and including a plurality of photosensitive elements disposed in an array configuration. The imaging device is configured to receive the spatially modulated optical waveform and provide a signal associated with light intensity at each of the plurality of photosensitive elements. The angle measurement device further includes an angle determination unit coupled to the imaging device and configured to compute a rotation angle of the patterned member based on a reference waveform and the provided signal.

According to another embodiment of the present invention, a method of determining a rotation angle is provided. The method includes illuminating at least a portion of a patterned member with an optical beam and transmitting at least a portion of the optical beam through the patterned member. The method also includes projecting at least a portion of the transmitted beam onto an imaging device having a plurality of photosensitive elements disposed in an array configuration and determining a first set of element signal values for each of at least a first subset of the plurality of elements. The method further includes computing a reference waveform using the determined first set of element signal values, rotating the patterned member, and determining a second set of element signal values for each of at least a second subset of the plurality of elements. Moreover, the method includes computing a measurement waveform using the determined second set of element signal values and determining the rotation angle as a function of the reference waveform and the measurement waveform.

According to an embodiment of the present invention, an angle measurement device includes a light source configured to emit light along an optical path and a patterned member positioned along the optical path and configured to rotate about an axis of rotation. The patterned member includes a periodic optical variation. Light passing through the patterned member provides a spatially modulated optical waveform. The angle measurement device also includes an imaging device positioned along the optical path and including a plurality of photosensitive elements disposed in an array configuration. The imaging device is configured to receive the spatially modulated optical waveform and provide a signal associated with light intensity at each of the plurality of photosensitive elements. The angle measurement device further includes an angle determination unit coupled to the imaging device and configured to compute a rotation angle of the patterned member based on a reference waveform and the provided signal.

According to another embodiment of the present invention, a method of determining a rotation angle is provided. The method includes illuminating at least a portion of a patterned member with an optical beam and transmitting at least a portion of the optical beam through the patterned member. The method also includes projecting at least a portion of the transmitted beam onto an imaging device having a plurality of photosensitive elements disposed in an array configuration and determining a first set of element signal values for each of at least a first subset of the plurality of elements. The method further includes computing a reference waveform using the determined first set of element signal values, rotating the patterned member, and determining a second set of element signal values for each of at least a second subset of the plurality of elements. Moreover, the method includes computing a measurement waveform using the determined second set of element signal values and determining the rotation angle as a function of the reference waveform and the measurement waveform.

According to embodiments of the present invention, an array of imaging elements are utilized to provide improved accuracy in comparison with convention angle measurement devices. Thus, embodiments of the present invention may be referred to as a multi-element, high-resolution (e.g., hyper-resolution), phase measurement system. Utilizing a high resolution imaging device such as a CCD array, gray scale maps of the elements in the array can be analyzed to determine the rotation angle of a patterned member, thereby providing high measurement accuracy. In some embodiments, the number of elements utilized in the analysis phase is reduced, typically trading off accuracy for a reduction in processing requirements. Thus, embodiments of the present invention provide a system designer with options not available using conventional designs.

Numerous benefits are achieved using the present invention over conventional techniques. For example, an embodiment according to the present invention provides an inexpensive angle measurement device with high accuracy. Additionally, embodiments of the present invention utilize relatively low cost light sensor arrays (e.g., charge coupled devices (CCD) or CMOS arrays) that are commonly used in electronic camera systems and are widely available. Because embodiments are relatively small, they can be incorporated in small systems. Furthermore, in some embodiments, the optical sensor array images can be rapidly electronically read out, which provides the opportunity to measure rotational direction and speed. Particular embodiments of the present invention incorporate many photosensitive elements in an array (e.g. a CMOS array), which enables the collection of more accurate angle measurements at a low cost. Additionally, the use of the wide area sensor array described herein enables convenient identification of the center of rotation on the array to allow for effective correction of eccentricity and alignment errors. Depending upon the embodiment, one or more of these benefits may exist. These and other benefits have been described throughout the present specification and more particularly below.

DETAILED DESCRIPTION OF SPECIFIC EMBODIMENTS

Embodiments of the present invention provide methods and systems for angle measurement characterized by improved accuracy in comparison to conventional systems. In a particular embodiment, a small, compact, highly accurate, and inexpensive angle measurement device is provided.

Figure 1A:
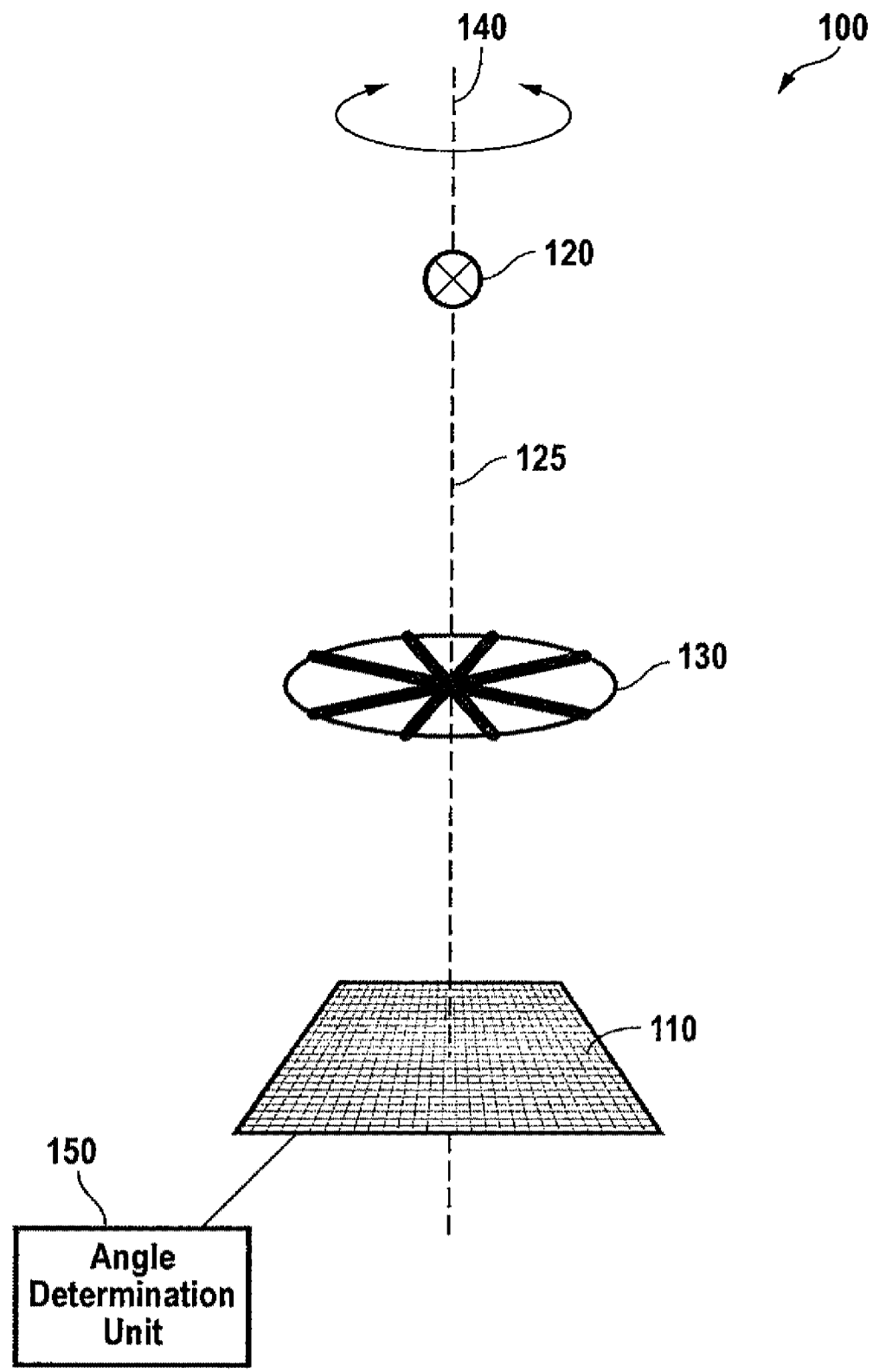
FIG. 1A is a simplified schematic diagram illustrating an angle measurement device according to an embodiment of the present invention.

FIG. 1A is a simplified schematic diagram illustrating an angle measurement device according to an embodiment of the present invention. As illustrated in FIG. 1A, the angle measurement device 100 includes a light source 120. The light source is typically a light emitting diode (LED) or other suitable source of optical radiation. In a particular embodiment, the light source is a small (e.g., point) source LED. A representative example is model ELC 645-29-5 available from EPIGAP GmbH of Berlin, Germany. The ELC 645-29-5 is a 645 nm LED that provides a light source diameter of 150 µm without the use of supplemental optics. Optical elements associated with the light source (e.g., reflectors, lenses, and the like) are not illustrated for purposes of clarity. Light from the light source 120 propagates along an optical path 125. For example, the light source is preferably a small light source with a uniform illumination pattern. Using an LED with a small illumination source (i.e., a point-LED), the diameter of the light source may be on the order of the structure of the periodic pattern of the patterned member 130, which will be described in more detail below. Other geometrical configurations of the illumination source are possible as discussed below.

The angle measurement device 100 also includes a patterned member 130 facing the imaging unit described herein and having a periodic pattern of different optical properties. Additional details related to the different optical properties of the patterned member will be described more particularly below. The patterned member is pivotably mounted to rotate about an axis of rotation 140. In an exemplary embodiment, the axis of rotation 140 is aligned with the optical path 125 and coincides with the center of the patterned member. Therefore, as illustrated in FIG. 1A, the patterned member 130 rotates in the plane perpendicular to the plane of the figure and approximately perpendicular to the optical axis. Light from the light source 120 impinges on the patterned member 130 and light passing through the patterned member is characterized by a spatially modulated waveform after transmission through the patterned member. In alternative embodiments, the light source is configured to rotate with the patterned member.

In the embodiment illustrated in FIG. 1A, the patterned member 130 faces the imaging unit 110 and has a first periodic pattern of different optical properties. The patterned member 130 may be made of a glass carrier carrying the periodic pattern or may be made of different optical materials. The pattern may be produced by lithography. The periodic pattern on the patterned member may have transparent, translucent, and/or opaque parts preferably arranged periodically with respect to the center of the pattern member when viewed in the circumferential direction. Generally, with respect to the center of the patterned member, there will be an integral number of pattern elements over the total circumference of the circle of the patterned member. Additionally, as described more fully below, in addition to the first periodic pattern, the patterned member may have a second periodic pattern that is different from the first periodic pattern. One of ordinary skill in the art would recognize many variations, modifications, and alternatives.

Further, the angle measurement device includes imaging device 110, which is also positioned along the optical path 125. In the embodiment illustrated in FIG. 1A, the imaging device and the patterned member are substantially parallel to each other. The imaging device 110 includes a predetermined number of photosensitive elements arranged in an array configuration. In some embodiments, the photosensitive elements may be referred to as photosensitive pixels. For example, the imaging device 110 may be any suitable imaging device, for example, a two-dimensional array of sensor elements capable of generating image information with a number of pixels generally corresponding to the number of elements of the array. The array may be a charge-coupled device (CCD) or a complementary metal-oxide semiconductor (CMOS) image sensor array. Other suitable arrays containing photosensitive elements are also included within the scope of the present invention. Merely by way of example, an array having 640×480 sensor elements is used in an embodiment. A square subset of the total number of elements may be used (e.g., 480×480 elements) to generate digital images of the modulated signal impinging on the imaging device. In a particular embodiment, the imaging device 110 is a monochrome OV7640/41 VGA CMOS sensor available from OmniVision of Santa Clara, Calif. The OV7640/41 has a pixel size of 5.6 μm and a built-in analog-to-digital (A/D) converter. Thus, the imaging device is configured to receive the modulated waveform and to provide a signal associated with the light intensity at each of the photosensitive elements. The imaging device is mounted to the fixed mechanical element of the system. The pattern of illumination from the light source through the pattern member rotates across the sensor elements during rotation of the pattern member.

As shown in FIG. 1A, the imaging device 110 is coupled to an angle determination unit 150 and is capable of exchanging data; e.g. data that is acquired by the imaging device, with the angle determination unit. For example, measurement values associated with the photosensitive elements may be transmitted to the angle determination unit 150. Any type of data transmission is conceivable, such as fixed line or wireless data transmission. In a particular embodiment, fixed line data transmission is utilized. The angle determination unit 150 may be realized by a hardware arrangement, such as by hard-wired circuits or ASICs (Application Specific Integrated Circuits) or software or any suitable combination of the above. One of ordinary skill in the art would recognize many variations, modifications, and alternatives.

In summary, operation of the angle measurement device involves generation of light at the light source, transmission of a portion of the light through the patterned member, and projection of the modulated pattern resulting from this partial transmission onto the imaging device. The projection through the periodic pattern impinges on the array of photosensitive elements. A rotation angle of the periodic patterned member with respect to a reference position is determined based on a computation utilizing a reference waveform and the signal provided by the imaging device. For example, a phase shift between the reference waveform and the signal may be used to determine the degree of rotation of the patterned member.

In some embodiments, a reference waveform is generated based on the signal provided by the imaging device at a reference position. Then, a measurement waveform is generated based on the signal provided by the imaging device resulting from the projected periodic image on the imaging device after rotation of the patterned member. In computing either the reference waveform or the measurement waveform, one or more curve fitting algorithms may be used to fit a waveform to the light intensity captured by each of the photosensitive elements of the imaging device may be performed. Computing the phase shift between the measurement waveform and the reference waveform can be used to determine the rotation angle. Utilizing a large number of photosensitive elements, accuracy is improved over conventional techniques.

As an example, in order to generate with the reference waveform or the measurement waveform, the light intensity captured by a series photosensitive elements arranged along an arc of a circle in a circumferential direction around the rotation axis 140 may be provided to the angle determination unit. Since the image formed on the imaging device is an image of a periodic pattern, the waveform is also periodic with a frequency corresponding to the periodicity of the pattern on the patterned member. Rotation of the patterned member will result in a phase shift between waveforms associated with different angles. The measured phase may then be compared to a reference phase value to obtain a phase difference associated with the particular rotation angle.

As described below, exemplary waveforms include sinusoidal waves characterized by a frequency and a phase. In one example, the frequency is equal to the number of periods used in the patterned member. Since the frequency is based on the periodicity of the periodic pattern, the phase may be extracted by a variety of different methods.

Figure 1B:
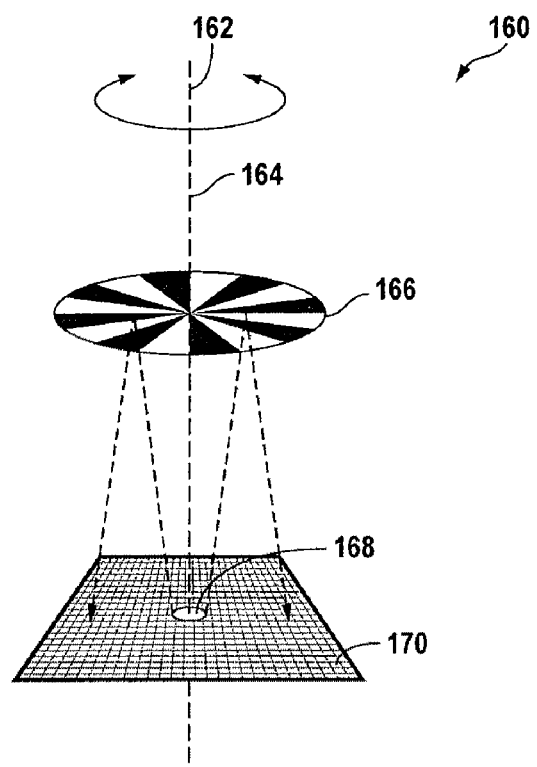
FIG. 1B is a simplified schematic diagram illustrating an angle measurement device according to another embodiment of the present invention.

FIG. 1B is a simplified schematic diagram illustrating an angle measurement device 160 according to another embodiment of the present invention. The angle measurement device illustrated in FIG. 1B shares common elements with that shown in FIG. 1A, but operates in a reflection mode rather than a transmission mode. As shown in FIG. 1B, a light source 168 is provided in the center of the imaging device 170. The light source 168 illustrated in FIG. 1B is a point source (e.g., a small LED) positioned at or near the center of the imaging device. In a particular embodiment, an LED is fixed to the glass cover of the imaging device. In another embodiment, the imaging device is designed and fabricated so that an integrated LED chip is provided in the middle of the array of the imaging device. In some embodiments of the present invention, since the center of the imaging device is not used in computing the angular rotation through phase shifts, the region in the center of the imaging device can be used to provide the physical location for the light source.

Light from the light source 168 is incident on patterned member 166, which includes a reflective bottom surface facing the imaging device. As discussed in relation to FIG. 1A, the patterned member is configured to rotate about an axis of rotation 162. Preferably, the axis of rotation 162 is aligned with the optical axis 164 of the measurement device. Light reflected off the rotating patterned member is incident on the imaging device 170, which is in electrical communication with the angle determination unit 150. Similar data processing methods as described in relation to FIG. 1A are applicable to the angle measurement device illustrated in FIG. 1B. Additional optics may be utilized in the angle measurement device 160 as appropriate to the particular application. One of ordinary skill in the art would recognize many variations, modifications, and alternatives.

Figure 1C:
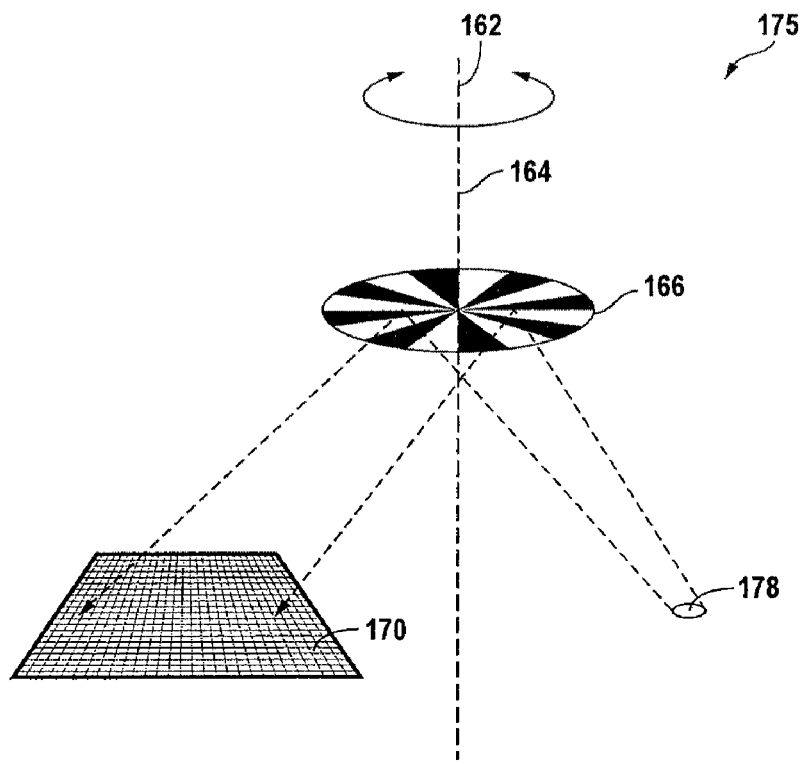
FIG. 1C is a simplified schematic diagram illustrating an angle measurement device according to yet another embodiment of the present invention.

FIG. 1C is a simplified schematic diagram illustrating an angle measurement device 175 according to yet another embodiment of the present invention. As illustrated in FIG. 1C, a reflective mode is utilized in which the light source 178 is positioned to the side of the imaging device, light is reflected off the rotating patterned member, and then is incident on the imaging device.

Figure 1D:
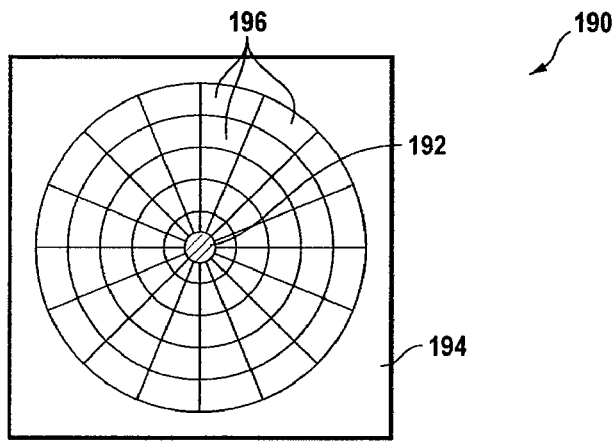
FIG. 1D is a simplified schematic diagram of an integrated light source and imaging device according to an embodiment of the present invention.

FIG. 1D is a simplified schematic diagram of an integrated light source and imaging device 190 according to an embodiment of the present invention. The integrated light source and imaging device 190 includes a light source (e.g., a LED) 192 located at the center of the imaging device 194. Although the light source is shown at the center, it could be positioned in the central region and/or could include more than one light source, for example, an array of LEDs. In the embodiment illustrated in FIG. 1D, the integrated light source and imaging device includes sensor elements 196 that are arrayed in a series of concentric ring sections, with each ring section containing an equal number of sensor elements 196. Thus, for each range of angles measured around the imaging device, a set of elements aligned along a radius subtends an equal angular range. Although only 16 radially aligned sets of elements are illustrated in FIG. 1D, this particular design is only provided for purposes of illustration and other embodiments will provide much higher pixel densities, with each set of radially aligned elements subtending a much smaller angular range than the 22.5° (i.e., 360°/16) shown in FIG. 1D.

The embodiment illustrated in FIG. 1D provides benefits in comparison with other techniques, including reduced electrical and mechanical requirements associated with illuminating the patterned member and detecting the reflected radiation at the sensor elements. Moreover, the design of the sensor elements can be tailored to the angle measurement applications described herein, rather than utilizing two-dimensional arrays positioned on an x-y grid. Although the resources used to set up and design a customized integrated light source and imaging device would generally be higher than those associated with the purchase of an off-the-shelf imaging device, advantages provided by these embodiments could make up for these additional resources as the number of units produced increases.

Figure 2A:
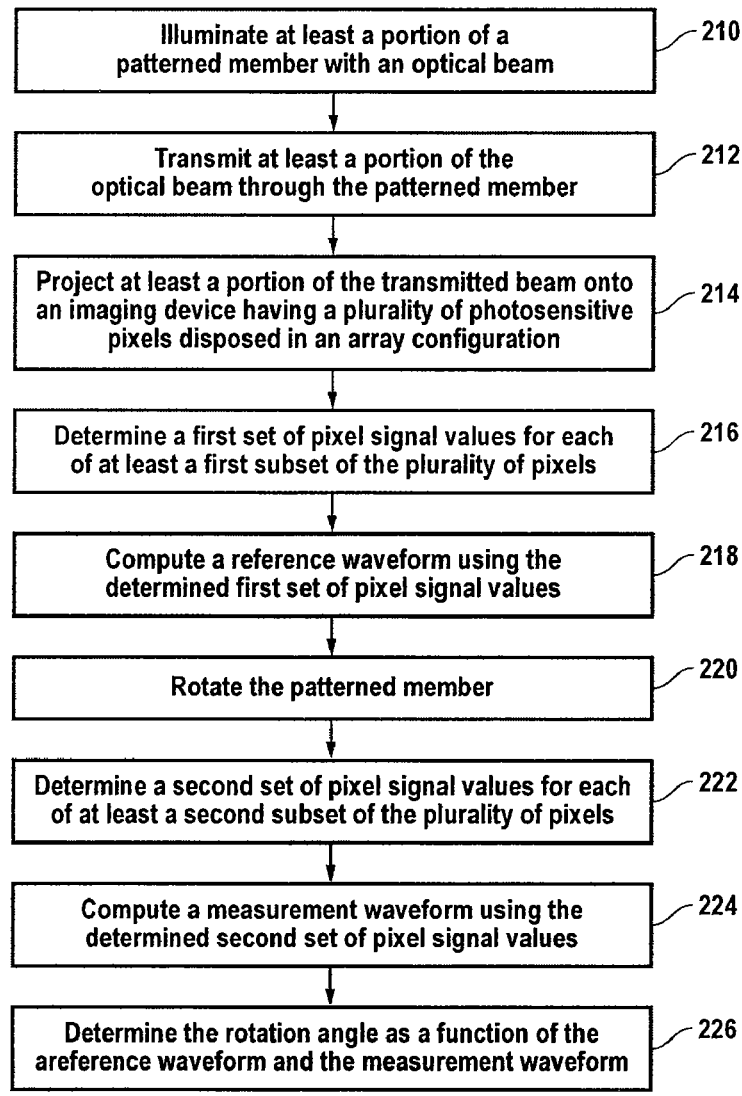
FIG. 2A is a simplified flowchart illustrating operation of an angle measurement device according to an embodiment of the present invention.

FIG. 2A is a simplified flowchart illustrating operation of an angle measurement device according to an embodiment of the present invention. After starting operation, at least a portion of a patterned member is illuminated with an optical beam (210). The optical beam may be provided by a suitable light source (e.g., a point-source LED or an extended source LED). A portion of the optical beam is transmitted through the patterned member (212). The light passing through the patterned member will have a spatially modulated profile associated with the pattern formed on or otherwise associated with the patterned member. At least a portion of the transmitted beam is projected onto an imaging device (214). As described in relation to FIG. 1A, the imaging device has a plurality of photosensitive elements disposed in an array configuration.

A first set of element signal values is determined for each of at least a first subset of the plurality of elements (216). For example, as described more fully throughout the present specification, and more particularly below, the first subset may be a number of elements associated with a predetermined angular range. A reference waveform is computed using the determined first set of element signal values (218). Curve fitting may be utilized in computing the reference waveform. In other embodiments, after the measurement values of the photosensitive elements of the imaging device are read out, at least a portion of the element intensity values are correlated with a mathematical model or a stored image of the pattern to determine the angle of rotation.

In a particular embodiment, as the element intensity values are read out of the imaging device, an angle is computed for each element based on the position of the element with respect to the calibrated center position of the imaging device. Alternatively, a look up table can be used to determine the angles of the various elements with respect to a center point. Generally, the element sizes are small enough that refinements based on element dimension (e.g., the angle subtended by elements at 0° and 45° are different) are not utilized although such refinements are possible. Additionally, because of the small element sizes, refinements of the element angle based on computations using the center of the element vs. the corner of the element are generally not utilized although such refinements are possible. Additional discussion related to element angle is provided in relation to the angle $\beta$ discussed with respect to FIG. 4A.

The patterned member is then rotated (220) and a second set of element signal values is determined for each of at least a second subset of the plurality of elements (222). A measurement waveform is computed using the determined second set of element signal values (224) and the rotation angle is determined as a function of the reference waveform and the measurement waveform (226). Depending on the data read out frequency of the various system components, it is possible in some embodiments to provide not only angular rotation data, but angular velocity information. In a specific embodiment, the read out frequency is on the order of 10 Hz. Typically, the data from all photosensitive elements of the imaging device is read out, even if only a portion of the data is utilized in determining the rotation angle. Since some high speed imaging devices operate at read out frequencies of up to and exceeding 1000 Hz, it is possible to provide angular velocity information for some applications. One of ordinary skill in the art would recognize many variations, modifications, and alternatives.

It should be appreciated that the specific steps illustrated in FIG. 2A provide a particular method of determining a rotation angle according to an embodiment of the present invention. Other sequences of steps may also be performed according to alternative embodiments. For example, alternative embodiments of the present invention may perform the steps outlined above in a different order. Moreover, the individual steps illustrated in FIG. 2A may include multiple sub-steps that may be performed in various sequences as appropriate to the individual step. Furthermore, additional steps may be added or removed depending on the particular applications. One of ordinary skill in the art would recognize many variations, modifications, and alternatives.

In utilizing the angle measurement device 160, similar procedures as discussed in relation to the device of FIG. 1A can be utilized. In step 212, rather than transmitting at least a portion of the optical beam through the patterned member, at least a portion of the optical beam will be reflected from the patterned member. At least a portion of the reflected beam will be projected onto the imaging device in step 214. Thus, other than operating in a reflection mode, the method of using the transmission mode angle measurement device 100 described in relation to FIG. 2A is also applicable to a method of using the reflection mode angle measurement device 160.

Figure 2B:
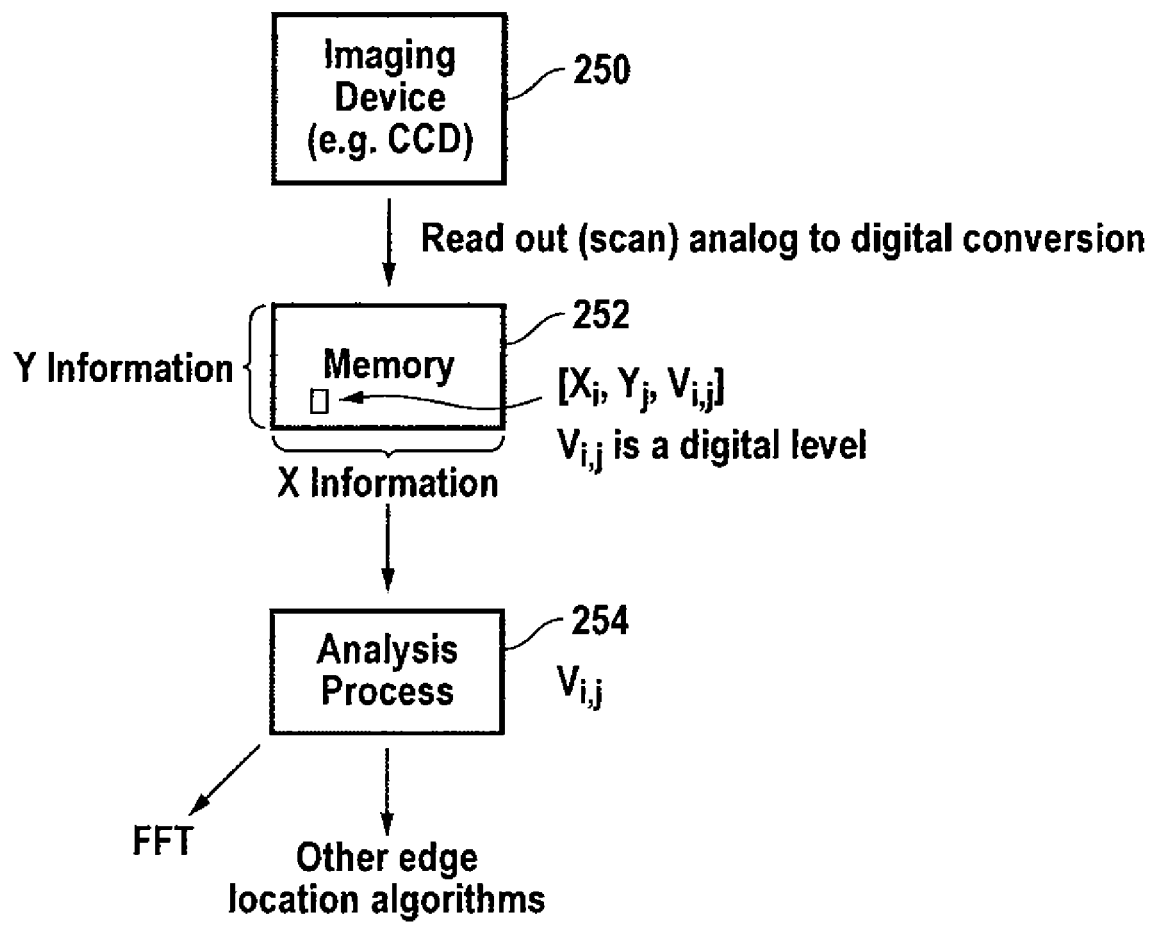
FIG. 2B is a simplified flowchart illustrating a method of reading out element signal data and performing analysis according to an embodiment of the present invention.

FIG. 2B is a simplified flowchart illustrating a method of reading out element signal data and performing analysis according to an embodiment of the present invention. Referring to FIG. 2B, data is read out from imaging device (e.g., a CCD) 250 and provided to memory 252. The data readout or scan may include analog to digital (A/D) conversion. For example, in reading out data from a CCD array, the voltages on the various elements, which are related to the intensity of light incident on the element, are read out as analog values and then can be converted to digital values for storage in a digital memory. In the embodiment illustrated in FIG. 2, the spatial information from the array is carried over into the memory and the data is stored in the format $[x_i, y_i, v_{(i,j)}]$, where $v_{(i,j)}$ is a digital signal level. Thus, for the elements in the array, the memory includes not only the signal associated with the element but the spatial location. It will be appreciated that in some imaging device, the memory may be included as a component of the imaging device, thereby combining this data readout and storage process.

Figure 5A:
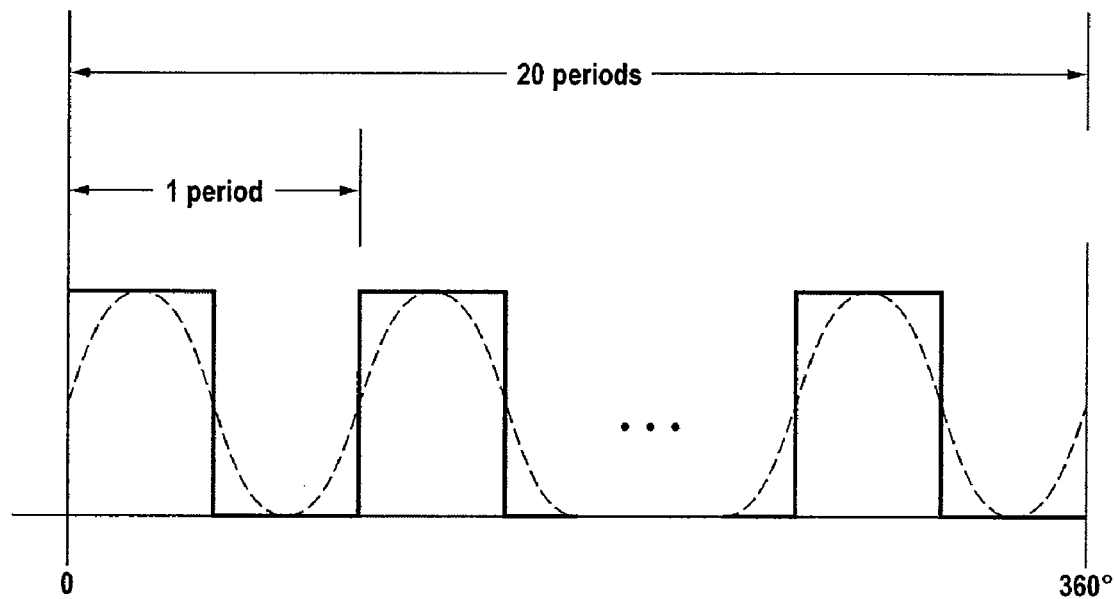
FIG. 5A is a simplified illustration of a first measurement waveform according to an embodiment of the present invention.
Figure 5B:
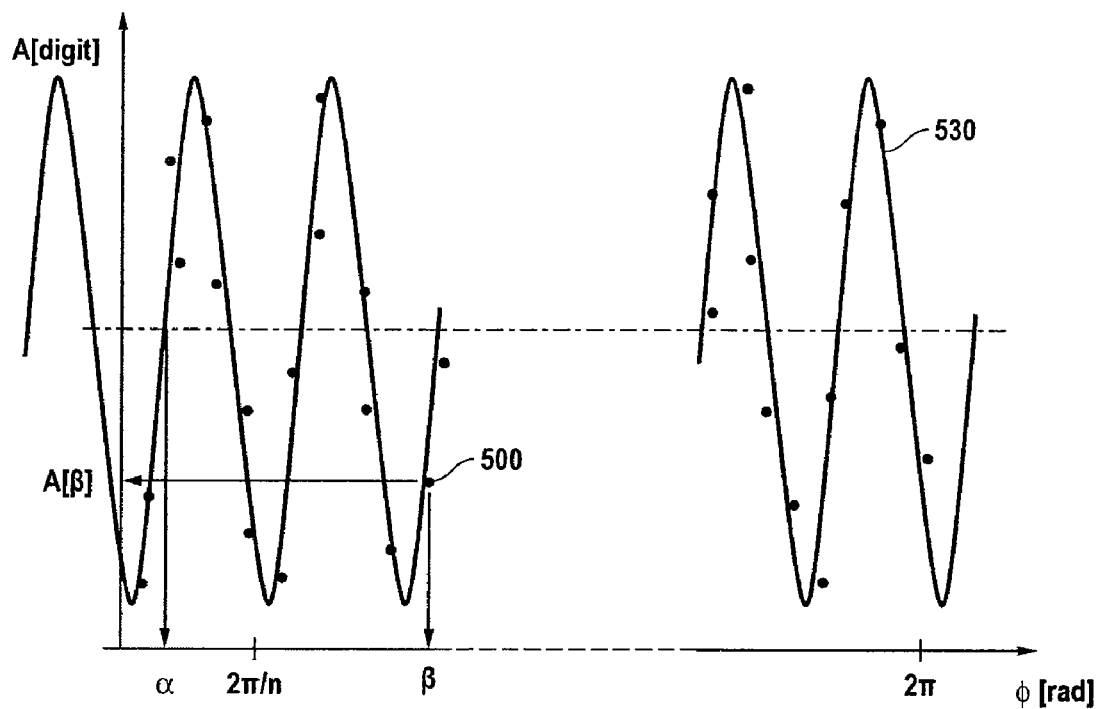
FIG. 5B is a simplified illustration of a second measurement waveform according to an embodiment of the present invention.

In a particular embodiment, the circle is divided into 20 sections, with each section being characterized by an angular range of 18° and containing an opaque element of 9° and a clear element of 9°. Then, each of these sections is divided into 100 portions, with each portion including an angular range of 0.18°. The elements in the array are evaluated in order to group the elements into the various 0.18° degree portions. Then the elements that fall into each of the various 0.18° degree portions are averaged to determine an average element intensity for each of the 100 portions per section. In this manner, around the complete circle, 2000 averaged element intensity values are provided, which may then be plotted as shown in FIG. 5A or FIG. 5B. It will be appreciated, that grouping algorithms that weight the elements as a function of overlap with the various 0.18° degree portions may be utilized although this is not required by the present invention. It will be appreciated that different numbers of portions can be used in other embodiments, as will be evident to one skilled in the art.

In one embodiment, the measurement values of the photosensitive elements are averaged along a radial line originating from the rotation axis. Since the imaging device is perpendicular to the rotation axis in this embodiment, averaging along radial lines leads to a more accurate averaged waveform. Thus, although 100 portions of each section are utilized in some embodiments, other embodiments utilize more finely divided portions as appropriate to the particular applications.

In some embodiments, rather than utilizing all of the sectors in determining the angular rotation angle, fewer than the total number of sectors is utilized. For example, a single sector could be utilized (providing 100 averaged element intensity values) to determine the phase shift associated with a particular angular rotation. It will be appreciated that theoretically, each section should provide the same element intensity data because of the periodicity of the patterned member. In one implementation, the radial elements of a portion of the patterned member may be known as a Siemens Star. The use of a single sector of the pattern for determination of the fine resolution angular rotation data enables the use of a single algorithm for both the fine and coarse resolution phase shift computations. In other embodiments, more than one sector and less than all the sectors are utilized. Further, since some embodiments utilize a large part of the imaging device, which has the same elements, this results in the production of a constant error that is independent of the rotation angle and that may easily be identified and corrected during either a calibration or post-processing step. In yet other embodiments, all of the sectors are utilized.

Data stored in the memory 252 is processed using analysis process 254. As examples, Fast Fourier Transform (FFT) techniques or other edge detection techniques may be utilized in various embodiments. For example, correlation algorithms may be utilized. Additionally, photographic feature detection (edge detection algorithms being an example of such algorithms) may be utilized during the analysis process. In these feature detection algorithms, the element intensity values for elements are compared to neighboring elements. From these element intensity values, a contour map can be generated across the element array. Because of the radially symmetric nature of the patterned member, the contour lines will be radial. Examination of the slopes perpendicular to the contour lines can be used to determine the edges of the projected image. From the locations of the edges, the phase shift can be determined and used to compute the rotation angle. In some embodiments, a unique feature is added to the patterned member, such as an identifying mark at a predetermined position, so that when the wheel is rotated, monitoring of the position of the unique feature can be used to determine the center of rotation of the patterned member. One of ordinary skill in the art would recognize many variations, modifications, and alternatives.

It should be appreciated that the specific steps illustrated in FIG. 2B provide a particular method of reading out element signal data and performing analysis according to an embodiment of the present invention. Other sequences of steps may also be performed according to alternative embodiments. For example, alternative embodiments of the present invention may perform the steps outlined above in a different order. Moreover, the individual steps illustrated in FIG. 2B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
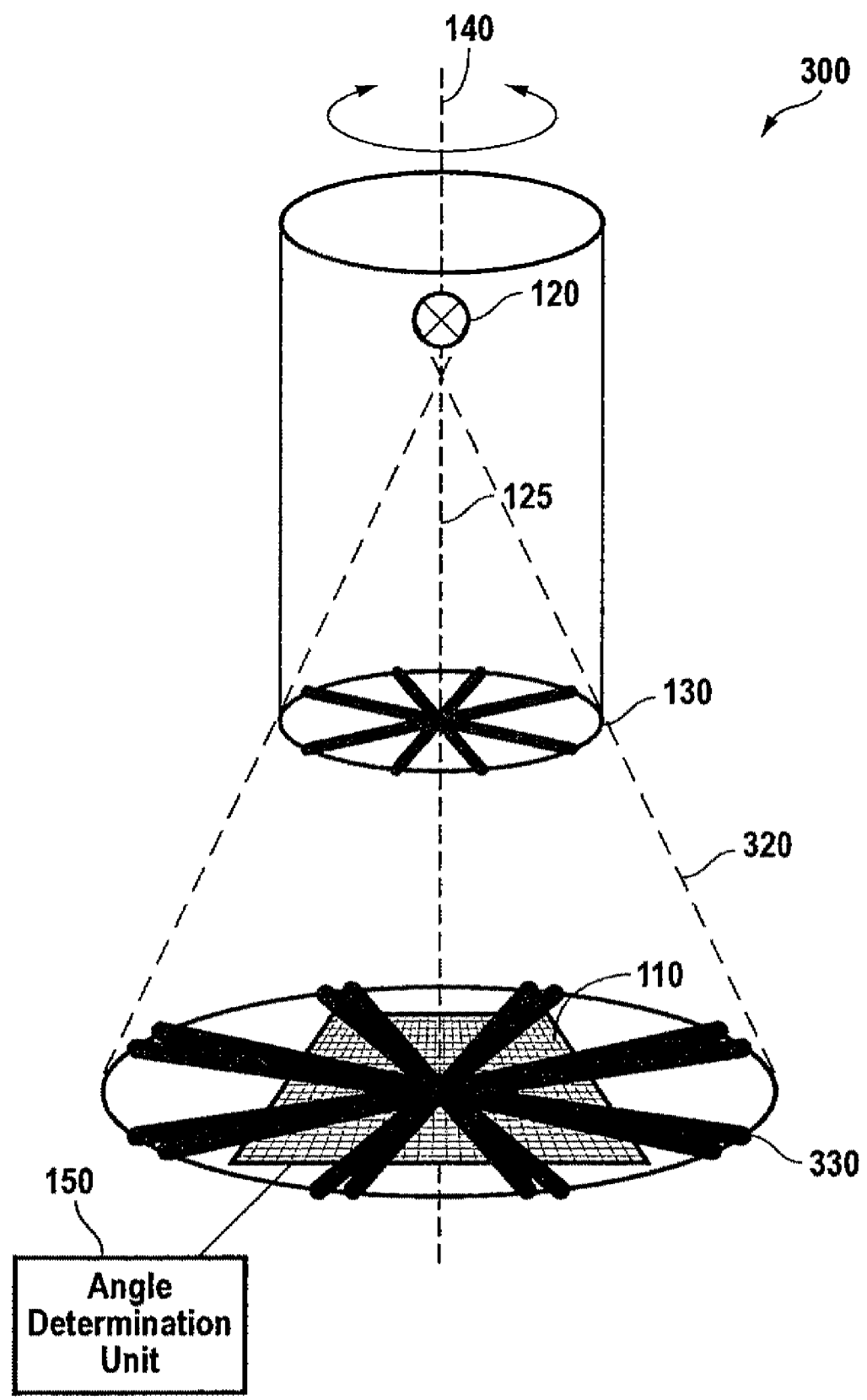
FIG. 3 is a simplified schematic diagram illustrating angle measurement device according to another embodiment of the present invention.

FIG. 3 is a simplified schematic diagram illustrating angle measurement device according to another embodiment of the present invention. Similar to the angle measurement device illustrated in FIG. 1A, the angle measurement device 300 includes a light source 120, a patterned member 130, an imaging device 110, and an angle determination unit 150. The light source and the patterned member are mounted in or otherwise fixed to a cylindrical shaft 310 so that the center of the cylindrical shaft 310 preferably coincides with the rotation axis 140. The patterned member is placed between the light source and the imaging device.

As illustrated in FIG. 3, the projection of the periodic pattern of the patterned member 130 leads to a periodic distribution of light intensities on the imaging device 110. The projection may be realized in a transmission mode as shown in FIG. 3, i.e., the patterned member is positioned between the imaging device and the light source. Further, one or more optical elements, such as a collimator, may be arranged between the light source and the patterned member or between the patterned member and the imaging device. In embodiments in which the optical properties of the periodic pattern are chosen to be reflective and non-reflective, similar advantages may be achieved by positioning the light source between the imaging device and the patterned member so that light reflected from reflective parts of the patterned member can be detected on the imaging device. One of ordinary skill in the art would recognize many variations, modifications, and alternatives.

In the embodiment illustrated in FIG. 3, the periodic pattern of the patterned member 130 is a pattern periodic with regard to the center of the patterned member, preferably coinciding with the rotation axis 140 and invariant in scale, i.e. the period is independent of the reproduction scale. The light source 120 is positioned substantially on the rotation axis 140 so that the patterned member 130 is illuminated in a manner such that the periodic pattern of the patterned member 130 is projected as an enlarged image 330 on the imaging device 110. Projection rays are shown by reference numeral 320 illustrating that the image of the periodic pattern overfills the imaging device 110. In a specific embodiment, the periodic pattern may be projected on the imaging device to form a rotationally symmetric projection image on the imaging device. Thereby, the image of the periodic pattern formed on the imaging device is constant except for rotation with respect to the rotation axis 140. Therefore, it is preferable that the intersection point of the rotation axis and imaging device, and the symmetry center of the image of the periodic pattern on the imaging unit substantially coincide along a line representing the axis of rotation.

In the embodiment illustrated in FIG. 3, the rotation axis 140 is substantially perpendicular to the imaging device 110 and preferably intersects the imaging device at approximately the center of the imaging device. As described below, calibration techniques are employed in some designs so that exact intersection of the rotation axis and the center of the imaging device is not required.

It will be appreciated that similar advantages may be achieved by providing a periodic pattern member in cylindrical form rotating around the light source and by providing an imaging device that is also cylindrical around the periodic pattern member so that an image of the rotating cylindrical periodic patterned member is formed on the inside of the larger cylindrical imaging unit. In this case, the cylinder axes should be substantially parallel and preferably coincide with the rotation axis.

In both cases, it is preferable to have the light source fixed with respect to the patterned member so that the patterned member is illuminated consistently. Therefore, the same light rays of the illumination pattern of the light source are incident on the same parts of the patterned member so that variations in the illumination pattern emitted from the light source are always added to the same variations in the periodic pattern of the patterned member and thus the same parts of the patterned member can be illuminated consistently. Utilizing calibration techniques, variations in the predetermined pattern can be compensated for if necessary. Thus, in some embodiments, the light source is configured to rotate about the axis of rotation. In other embodiments, the light source is fixed in relation to the patterned member. In yet other embodiments, the light source and/or the patterned member are fixed in relation to the imaging device, which is configured to rotate about the axis of rotation.

Once measurement values for the photosensitive elements of the imaging device are obtained corresponding to the variations of intensity incident on the imaging device, this information may be conveyed to the angle determination unit 150. The angle determination unit 150 then determines the rotation angle. In the angle determination unit 150, the rotation angle of the patterned member with respect to a reference position on the imaging device may be derived from the image read out of the periodic pattern and a reference phase value, for example, obtained from a known mathematical function of the periodic pattern in a reference position regarding the coordinate system of the imaging unit.

It should be noted that it is not necessary that the whole pattern member is covered by the periodic pattern and as described below in relation to FIG. 4, different periodic patterns can be formed on different portion of the patterned member. Additionally, although the light source 120, the center of the patterned member 130, and the center of the imaging device 110 are illustrated in FIG. 3 as aligned with the rotation axis 140, this is not required by some embodiments of the present invention. For example, if the light source is moved laterally, the projection of the center of the periodic pattern will not be positioned at the center of the imaging device. Alternatively, the center of the patterned member could be shifted laterally with respect to the center of rotation of the patterned member.

In this case, the intersection point of the rotation axis and the imaging unit does not necessarily have to be aligned but may be determined by suitable methods. The center of the periodic pattern of the image, i.e., position of the center of rotation on the imaging device in X-Y-coordinates, may, for example, be determined by a best fit. By repeating this method with different rotation angles, a circle is obtained in first approximation, which is given by the position of the center of the periodic pattern in the image dependent on the rotation angle. The center of the circle corresponds to the intersection point of the rotation axis and imaging unit and can be calculated. This point corresponds to the center of the circle or ring used for obtaining the measurement values. To center the image, the illumination unit may then be moved so that the center of the periodic pattern of the image coincides with the intersection point.

In another embodiment, the center of the imaging device is defined, not in terms of the array dimension, but the position of the image of the patterned member on the imaging device. In this embodiment, in order to compensate for misalignment of the light source, the patterned member, and the imaging device, the center of the sensor array is defined in terms of the position of the center of the periodic pattern projected onto the imaging device. For example, if the semicircles have a radius of 10 elements, then the element lying at a distance of 10 elements from each of the opposing sides of the semicircle will be defined as the center element. This "center element," which may not be the physical center of the element array is then used to compute the angles of the various elements in relation to this defined "center element." Thus, embodiments of the present invention, rather than requiring alignment techniques to force the center of the image to correspond to the physical center of the imaging device, define the center of the imaging device in terms of the image projected onto the imaging device. This "center element" may be referred to a calibrated center element.

Figure 4A:
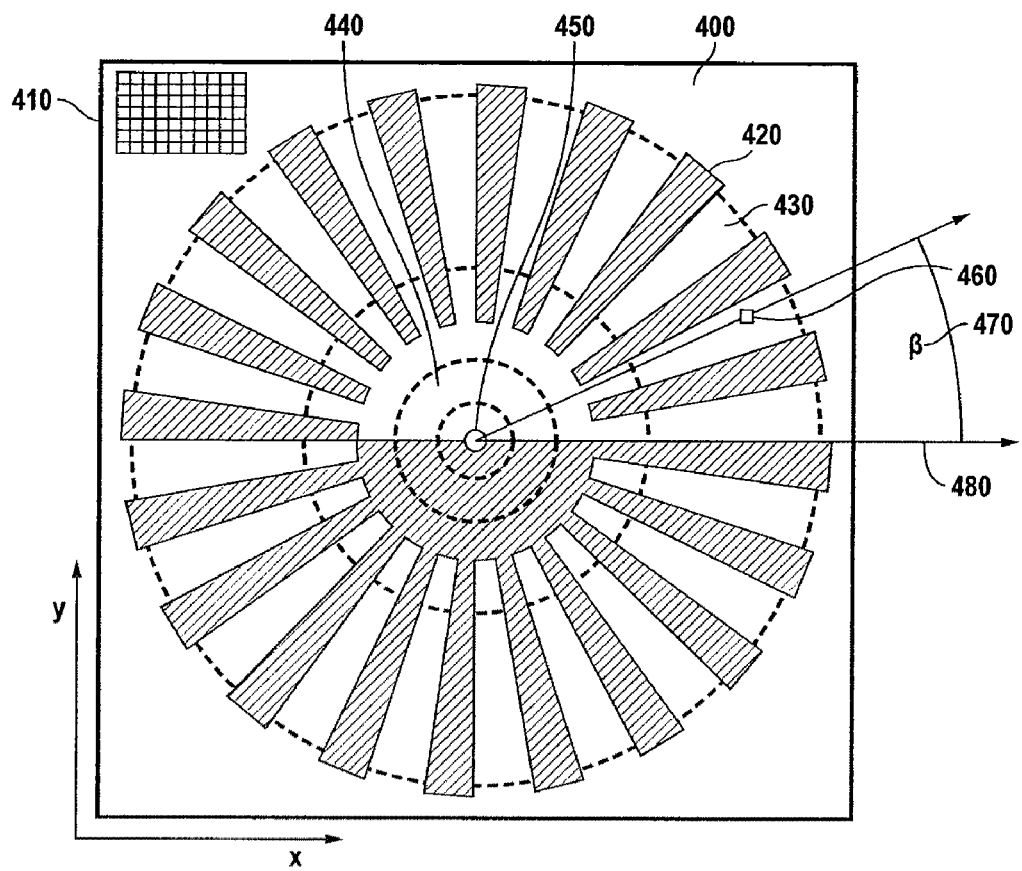
FIG. 4A illustrates a projection of one representative type of periodic pattern on an imaging device according to an embodiment of the present invention.

FIG. 4A illustrates a projection of a periodic pattern on an imaging device according to an embodiment of the present invention. As shown in FIG. 4A, an optical structure including a patterned member or pattern combination, preferably a periodic pattern, is provided. As described above, the patterned member is illuminated and an image is projected on an imaging device using predetermined collimation or focusing optics as necessary. The patterned member and the imaging device are configured so that one or both of the elements rotate with respect to each other, with the rotation axis intersecting patterned member and the imaging device near their centers.

According to embodiments of the present invention, a patterned member including two or more radially symmetric patterns characterized by alternating optical properties (e.g., opaque and transparent segments) is employed. The radially symmetric pattern radiates from a center point. As illustrated in FIG. 4A, each of the radially symmetric patterns (also referred to as segments) subtends the same angle. In various embodiments, there may be two or more segments, such as the 20 segments illustrated. Referring to FIG. 4, an outer portion of the patterned member includes elements from a Siemens Star, which have been used to measure optical resolution of cameras. At portions of the patterned member having a radial dimension greater than a predetermined radius, the radially symmetric pattern includes alternating opaque and transparent segments of a circle extending toward the edges of the patterned member. At portions of the patterned member having a radial dimension less than the predetermine radius, a separate coarse angle measurement system with a separate optical pattern is utilized. As shown in FIG. 4A, two semicircles are utilized, as described more fully throughout the present specification, to provide coarse angle information. Circular boundaries for the selecting the pixel elements to be analyzed are only representative of many alternative selection criteria as will be evident to one of skill in the art.

The pattern shown in FIG. 4A is a pattern consisting of two periodic patterns, one disposed in an outer region and the other disposed in an inner region. The dark areas represent regions of shadow of the pattern elements and light areas represent regions illuminated by the light source. For point of reference, in FIG. 4A, a portion of the photosensitive elements 410 of the imaging device 400 are illustrated in the upper left hand corner of the figure. The position of the photosensitive elements with respect to each other is known. The patterned member 420 includes an outer region having a circular section of a Siemens Star with twenty sectors and an inner region having black and white semicircles. Both regions are centered on the rotation axis 450 in a specific embodiment. The patterns defined on the patterned member may be formed using suitable opaque materials, such as chrome, silver, aluminum, other metals, or the like. In a particular embodiment, the opaque material includes one or more inks, which may be formed on the substrate for the patterned member using inkjet printing techniques. Inks of any opaque color will be applicable to embodiments of the present invention and may be included in a single layer or multiple layers as appropriate to the particular application.

For purposes of clarity, the pattern illustrated in FIG. 4A is illustrated with clearly defined edges. However, as described more fully throughout the present specification, it is advantageous in some embodiments to blur the edges of the image formed on the imaging device, which may be performed by suitable selection of the distances between the light source, patterned member, and imaging device so that varied light intensities (sometimes referred to as gray scale values) are provided at the photosensitive elements and not only either black or white element intensities. Thus, in some embodiments, the measurement values correspond to different gray scale values and an increased amount of information is provided by the projected periodic pattern, in particular on the intersection of opaque and transparent or translucent parts of the pattern member, where the measurement values of photosensitive elements may be intermediate values between maximal and minimal gray scale values. In other embodiments, blurring of the image is not performed and edge detection algorithms are utilized to determine the periodicity of the image formed on the imaging device. Another method of blurring the edges of the image is by suitable selection of the diameter of the light source so that measurement values corresponding to different gray scale values may be achieved.

As an example, blurring of the light associated with the edges of the elements of the Siemens Star may result from perspective illumination from a point-source LED. In this example, the light from the light source is emitted in a cone of rays and does not form a light beam characterized by parallel ray propagation. The divergence of the light coming from such a point-source will result in light passing by the edge of the elements of the Siemens Star being projected onto a range of locations on the imaging device. Thus, the outline of the patterned member is not imaged one to one, but blurring of the image results. In a particular embodiment, the point-source is a single or narrow wavelength LED (or an LED with a narrow bandwidth of a few nm), for example, a red LED emitting light at about 750 nm. In other embodiments, an extended source may be used as appropriate to the particular applications. It should be noted that in the geometric optics analysis provided above, the effects of diffraction and resulting interference due to the edges of the elements (including some edge roughness) of the Siemens Star has been assumed to be negligible for purposes of clarity of explanation.

In the embodiment illustrated in FIG. 4A, the patterned member (i.e., a Siemens Star) includes a periodic pattern of black or opaque and white or transparent elements. The fine measurement section of the illustrated patterned member in this representation includes 20 of these periodic elements. In other embodiments, a sinusoidal wave pattern is printed or otherwise formed on a transparent member, providing a periodic pattern that includes what may be referred to as shades of gray, not just opaque and transparent. In a particular embodiment, a photographic image that corresponded to a sinusoidal wave pattern, with peaks centered at the center of the opaque portions of the elements and valleys centered at the center of the transparent portions of the elements was utilized to form the patterned member. In this particular embodiment, light passing through the patterned member resulted in the formation of a sinusoidal image on the imaging device, independent of blurring by use of a point-source as the illumination unit.

Because the cost of forming a patterned member with shades of gray may be higher than patterned members with opaque and transparent elements, system designers may select one design based on the particular applications. In one low-cost design, a lithographic process is used to print an opaque/clear pattern on a glass medium. Leveraging technology utilized in the fabrication of reticles, line thicknesses of about 1 $\mu$m and sub-micron accuracy is available. System tradeoffs between generation of element intensity values characterized by more sinusoidal-like patterns as a function of angle and algorithmic complexity in determining the phase shift for less sinusoidal-like patterns will be evident to one of skill in the art. Thus, the scope of the present invention is not limited to one particular design, but includes several different design approaches. One of ordinary skill in the art would recognize many variations, modifications, and alternatives.

The measurement values of the imaging device are transferred to the angle determination unit 150 to determine the rotation angle of the image of the pattern 420 with respect to the imaging unit 400. In some embodiments, a transformation is provided between the Cartesian coordinate system characteristic of the imaging device array element locations to the polar coordinate system. The origin of the polar coordinate system is preferably the previously defined intersection point, for example, the center point 450. A reference position or direction 480 may be chosen arbitrarily so that the position of the photosensitive elements may then be defined by a radius and an angle and can be calculated with respect to the reference direction. Thus, the exemplary photosensitive element 460 may be associated with the angle β (470). Alternatively, instead of measuring an angle or a corresponding phase with respect to a reference position corresponding to a reference phase value, the reference phase value may also be derived from a previously obtained waveform constituted by measurement values of photosensitive elements, as will be described further below.

The discussion provided herein related to a reference waveform may be understood as a reference position or reference angle that is used to define the "zero" rotation angle and provide a frame of reference in which to define the phase shift after rotation. It should be noted that the reference phase value may be derived from a previously obtained waveform constituted by measurement values of the photosensitive elements, for example, at a previous point in time or a previous rotational angle. Accordingly, the reference phase value of a previously obtained waveform may be calculated in the same way as the phase of the present waveform, so that measurement errors are the same for both determinations and thus cancel out. Thereby the relative phase shift can be determined with high accuracy.

In an embodiment, only photosensitive elements in region 430 located between the two outer dashed rings (which are centered on the center point 450) are used in determining the rotation angle at a first (e.g., fine) precision, and only photosensitive elements in region 440 located between the two inner dashed rings (also centered on the center point 450) are used in determining the rotation angle at a second (e.g., coarse) precision. The scale relationship and the mechanical conditions are typically provided so that the rings are inside the pattern to be evaluated. In other embodiments, all available elements are utilized (e.g., from the inner extent of the 20 period pattern to the outer edge of the pattern). In configurations in which the pattern overfills the imaging device, elements at the very edges of the imaging device may be utilized in determining the rotation angle.

As an example, instead of using all the elements lying between each set of two rings, it is also possible to obtain a measurement waveform for use in determination of the rotation by using measurement values of a sequence of photosensitive elements disposed at a given radial dimension with respect to the center point 450. As described above, reference to the center point does not necessarily refer to the element at the center of the imaging device, since the center point can be defined in terms of the center of the image, even if shifted with respect to the physical center of the array. It will be appreciated that the measurement accuracy will generally be related to the number of measurement values utilized in the analysis.

In a particular embodiment, the measurement values of photosensitive elements lying along a radial line (e.g., inside the set of two rings) are averaged to enhance the measurement accuracy. Enhanced measurement accuracy may be achieved by averaging of certain photosensitive elements with the same weight across the whole imaging unit preferably symmetrically, which may reduce the impact of imaging device related distortions (e.g., varying element responsivity, misalignment of elements, and the like).

Although the pattern illustrated in FIG. 4A is a portion of a Siemens Star with 20 sectors in the periodic pattern, this is not required by embodiments of the present invention. Rather, other periodic patterns are included within the scope of embodiments of the present invention. As discussed above, periodic patterns including gray scale elements are included within the scope of the present invention. Additionally, although only two periodic patterns (one with a higher periodicity) are utilized in the embodiment illustrated in FIG. 4, the present invention is not limited to just two periodic pattern as more may be utilized.

Figure 4B:
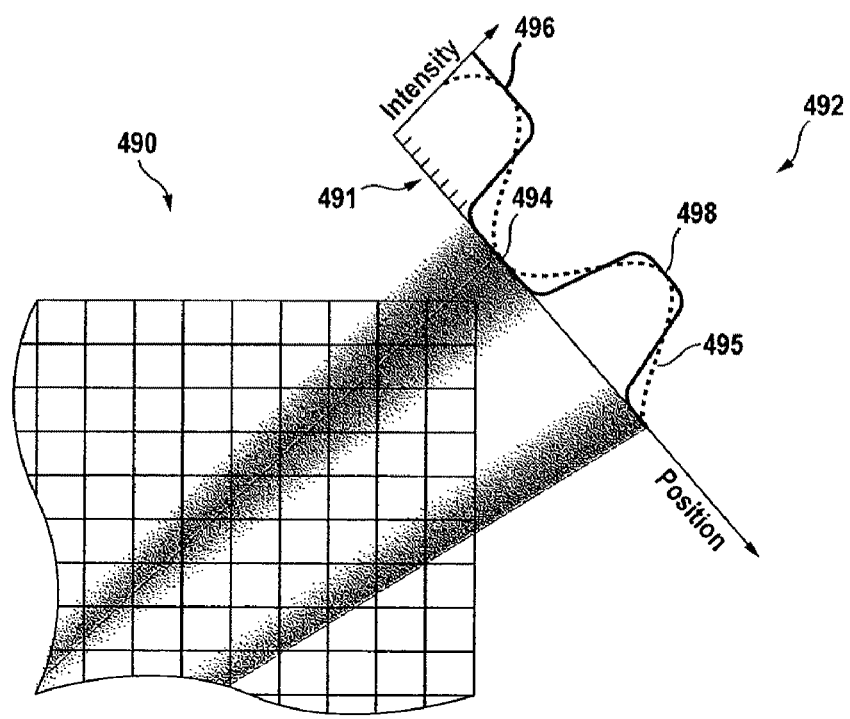
FIG. 4B illustrates a magnified view of a portion of the projection of the periodic pattern illustrated in FIG. 4A.

FIG. 4B illustrates a magnified view of a portion of the projection of the periodic pattern illustrated in FIG. 4A. As illustrated in FIG. 4B, the correspondence between the element illumination and the element location is shown. Portion 490 of FIG. 4B can be understood as the physical view, illustrating the boundaries between light and dark illumination regions and portion 492 can be understood as an analysis view, in which the intensity measured at each of the elements is represented as a function of position. Thus, FIG. 4B also illustrates the intensity (averaged along a radial direction) as a function of position across the array of photosensitive elements. As the patterned member rotates, fine shades of gray can be determined at various angular positions.

A dark band associated with the opaque portion of one of the elements is illustrating providing a minimum signal to the photosensitive elements at location 494. A maximum signal is provided to the photosensitive elements associated with the light band (transparent portion of the periodic pattern) at location 496 and at location 498. In between the maximum signals and the minimum signals, a grayscale portion characterizes the signal at the edges of the opaque and clear patterns. As discussed throughout the present specification, blurring of the image formed on the imaging device results in the generation of this grayscale portion. Depending on the embodiment, a sinusoidal curve may be fit to the measured light intensity data, illustrated by curve 495 in FIG. 4B. Various analysis techniques may be used (e.g., a Fast Fourier Transform (FFT)) to generate the sinusoidal signal. The phase of the measured sinusoidal signal, when compared to a reference phase, can be utilized to determine the rotation angle of the measurement device.

In a particular embodiment, a map of the elements in the imaging device (e.g., a CCD array) is stored in a spreadsheet that represents the gray scale value of each element. This element may will represent the gray scale content of the various elements and can be used to determine the edge of the lines in the radial shadow illustrated in FIG. 4B. The spreadsheet data can be utilized in various algorithms, including Fourier-based computations, edge detection algorithms, and the like.

In some embodiments, in contrast with the periodic patterned member illustrated in FIG. 4A, an alternative patterned member may utilize a non-periodic pattern, i.e., a pattern with a periodicity repeating at 2π radians. For example, a 2-dimensional barcode, checkerboard patterns, sets of parallel lines, combinations, thereof, and the like, are non-periodic patterns that may be utilized in some embodiments. Without limiting embodiments described herein, the characteristics of an efficient pattern include pattern shapes that produce significant changes between the gray scales of various elements on the imaging device elements as a function of rotation angle. In order to determine a phase associated with the rotation angle, pattern matching software can be utilized. Additionally, image correlation techniques can be utilized to determine the phase associated with the rotation angle of the patterned member. One of ordinary skill in the art would recognize many variations, modifications, and alternatives.

Figure 4C:
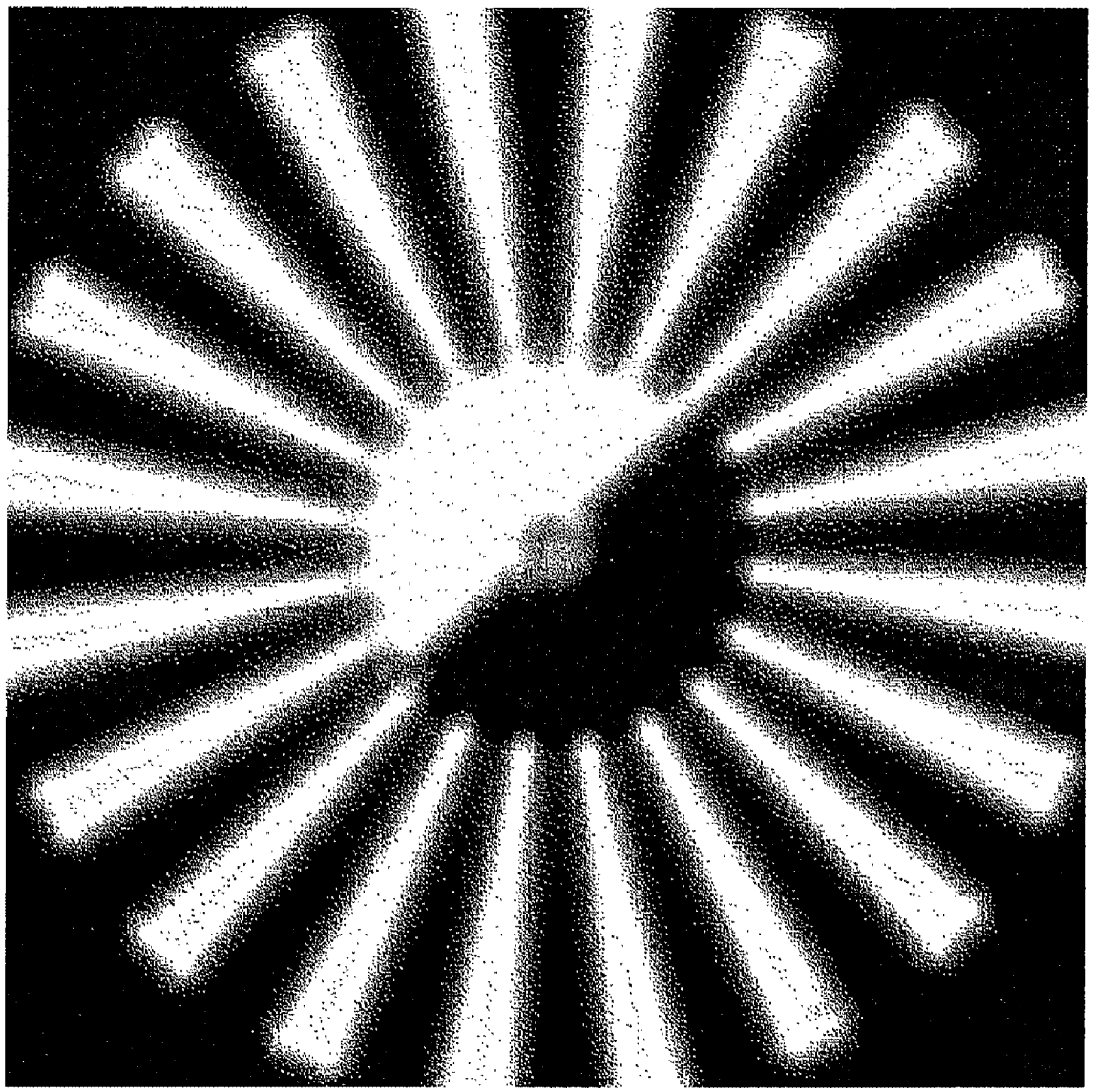
FIG. 4C illustrates data collected using a patterned member according to an embodiment of the present invention.

FIG. 4C illustrates data collected using a patterned member according to an embodiment of the present invention. The data illustrated in FIG. 4C was collected using a 200×200 CMOS sensor with a built-in A/D converter. The bright portions of the figure illustrate higher gray scale value and the dark portions of the figure illustrate lower gray scale values. As shown by the pattern measured using the CMOS sensor, the patterned member was similar to that shown in FIG. 4A, with 20 Seimens Star elements disposed on the periphery of the patterned member and a hemisphere disposed on the central portion of the patterned member. The data collected by the sensor can be exported to one of several computational engines configured to compute the periodicity of the data as described more fully throughout the present specification.

Generally, the gray values of the sensor elements will be read out element by element and line by line (e.g., 200 columns×200 lines=40,000 elements) In an embodiment in which only elements within either the inner or outer rings are utilized, the gray scale values for the sensor elements are filtered to remove data associated with elements outside of the region bounded by the rings. Because of the shape of the rings, each line of sensor elements lying within the rings will have a different number of sensor elements. Additionally, the different sectors can, in general, have different numbers of assigned elements. As discussed above, a look up table can be utilized to store the sector number for each element and the number of elements per sector.

As described throughout the present specification, embodiments of the present invention provide methods and systems for determining angular displacement measurements by pattern matching, using the gray scale content of photosensitive elements. In a specific embodiment, methods and systems are provided that utilize a spreadsheet including data related to imaging element amplitudes in terms of a gray scale content for a given shadow pattern, The shadow pattern may be from all sides of a pattern eigenvalue, like a radial spoke, a checkerboard, a series of parallel lines of arbitrary spacing, or the like. This specific pattern becomes the template for performing one of several pattern matching techniques at the sub-pixel level, including high speed pattern matching techniques. As an example, a stored reference pattern may be rotated and its pixel content overlaid on the measured data point. The pattern can be rotated until a match is found, for example, based on a match metric that compares the elements, element by element, based on other techniques that use a subset of the elements, based on FFT techniques, or the like.

FIG. 5A is a simplified illustration of a first measurement waveform according to an embodiment of the present invention. As illustrated in FIG. 5A, element intensity values are plotted as a function of angle. The data plotted in FIG. 5A corresponds to the patterned member described in reference to FIG. 4A, with 20 periods over a full circle. One period is shown at angles from 0°-18°. The element intensity values (which each may be an averaged value) are plotted as well as a sinusoidal best fit, which will have a form:

$$\sin\left(\frac{\varphi}{2\pi/n} + \delta\right),$$

where $\varphi$ is the angular variable in radians, n=20, and $\delta$ is the phase shift of the sinusoidal waveform.

FIG. 5B is a simplified illustration of a second measurement waveform according to an embodiment of the present invention. The plot in FIG. 5B shows the measured element intensity values as a function of angle (A($\varphi$)). The measured element intensity values are illustrated as dots as a function of angle and a curve fit to the dots is also illustrated. The gray scale intensity of an exemplary photosensitive element 500 (which may be an average of several elements in an angular range) is shown with an angle $\beta$ and the intensity A[$\beta$]. Measurement values of the intensity incident on photosensitive elements are shown in FIG. 5B for the angle range 0 to $2\pi$ corresponding 0 to 360°. Depending on the exact imaging conditions, the measurement values in the diagram may be distributed on a curve with n periods having a period length of $2\pi/n$.

The angle determination unit 150 may then fit a periodic shape to the measurement values of the waveform constituted by these measurement values shown in FIG. 5B to obtain an approximation of this waveform and to obtain a phase. Since usually the period and period length are known from the periodic pattern, the frequency of the waveform is known so that the phase may easily be obtained. In FIG. 5B, the value for the phase is $\alpha$. Therefore, for example, the phase may be derived from a fit or better best fit of an n-period sine wave to the measurement values of the photosensitive elements of the outer region for fine angle determination.

In a particular embodiment, an FFT is applied to the measurement values making up the waveform to obtain the phase of the measurement values and thus a phase shift. In other embodiments, other analysis techniques (including other Fourier analysis techniques) are utilized including edge detection algorithms. It should be noted that the phase value $\alpha$ obtained using some curve fitting algorithms corresponds to the rotation angle, but with an ambiguity of $k*2\pi/n$, since for the patterned member illustrated in FIG. 4A, all twenty sectors of the Siemens Star are substantially identical. To be more specific, the rotation angle corresponds to a phase shift, i.e., a phase shift or phase difference between a measured phase and a reference phase value, with the reference phase value may be derived from a previously obtained waveform. In this example, the reference phase value may be defined as the value zero so that the phase is equal to the phase shift.

To resolve any ambiguity present in the value of the phase shift, the second periodic pattern discussed with respect to FIG. 4A for coarse angle determination may be used. The pattern of two semicircles represents a repetition of a second basic shape that repeats fewer times on the patterned member than the first periodic pattern. For example, the second basic shape illustrated in FIG. 4A is two semicircles, one black and one white. In other embodiments, other opaque, translucent, transparent shapes, or combinations thereof may be utilized. Instead of two semicircles, two triangles may also be used as periodic patterns. In other embodiments, a periodic pattern that leads to a waveform when rotated and imaged, as discussed below, is utilized and the waveform will have a periodicity defined by the pattern.

In alternative embodiments, any ambiguity is resolved by counting the number of sectors that pass by a certain location (e.g., an element in the imaging device) when the patterned member rotates with respect to the imaging device so that the phase may be obtained during rotation.

Referring once again to FIG. 4B, a series of hash marks 491 have been illustrated on the intensity vs. position plot. As discussed in relation to FIG. 5B, the intensity plotted in FIG. 4B is typically a series of intensity values, which may be an average along a radial direction. In a particular embodiment, the period of the patterned member repeats at 18° intervals, with each 18° section being divided into 100 portions. The hash marks 491 in FIG. 4B are meant to illustrate these 100 portions, although for purposes of clarity, the spacing between the hash marks is much great than 1/100th of an 18° section. Thus, the intensity vs. position data illustrated in FIG. 4B should be understood to represent a value associated with the element intensity values in a portion and the illustration as a solid curve is merely for purposes of clarity.

In the embodiment illustrated in FIG. 4B, the portions utilized in determining element intensity values are much smaller than the size of the array elements of the imaging device. Thus, the angular resolution provided by embodiments of the present invention is much higher than the angular separation between adjacent elements. For example, for a patterned member having a segment periodicity of ½oth of 360°, the segments can be divided into 100 portions, the intensity associated with elements having a center lying within a portion can be averaged, and the averaged intensities can be utilized by a FFT routine to determine a waveform associated with the averaged intensities. Thus, embodiments of the present invention provide methods and systems for utilizing the gray scale values of the imaging device elements, which can vary over a number of resolutions depending on the particular imaging device and associated electronics, to improve the accuracy of angle measurement systems.

Figure 5C:
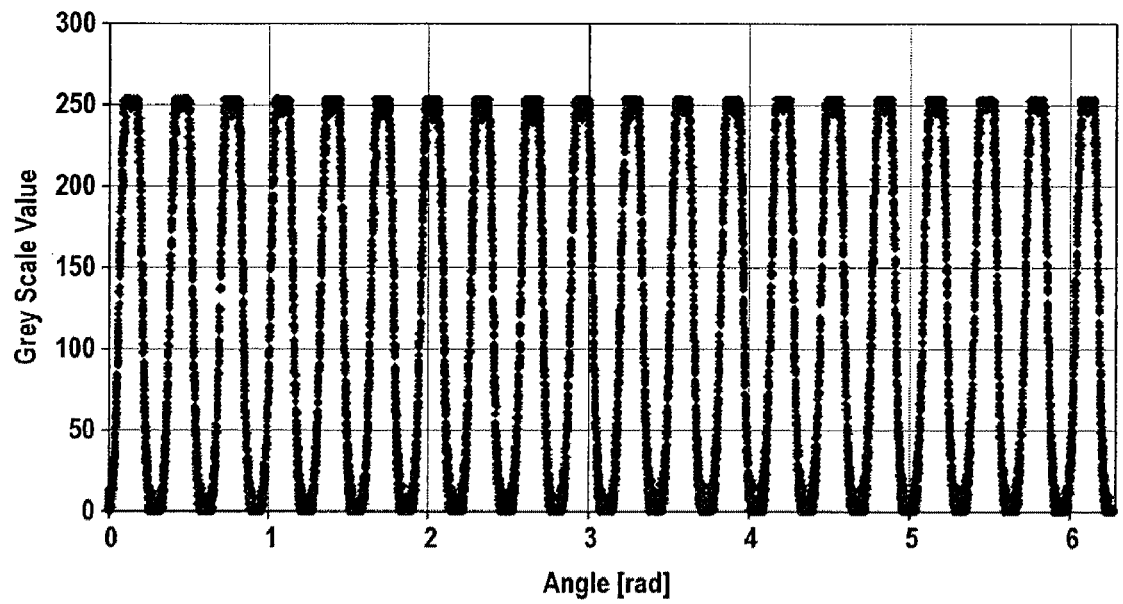
FIG. 5C illustrates data collected using an angle measurement device according to an embodiment of the present invention.

FIG. 5C illustrates data collected using an angle measurement device according to an embodiment of the present invention. Referring to FIG. 5C, 20 periods covering $2\pi$ radians are plotted for an annular ring covering a predetermined radial dimension associated with the high periodicity patterned member (e.g., the spokes of the Siemens Star). The data from the sensor elements is plotted as a function of angle with the angular positions of the pixel referenced to a center point. Because the periodicity of the patterned member repeats at a frequency of $2\pi/20$, 20 peaks are shown in the actual data. The data plotted in FIG. 5C was not averaged, although averaging or other processing of data can be performed in other embodiments.

It should be noted that in some embodiments, measurements associated with multiple sections of the periodic member may be overlapped and then curve fitting or other analysis routines can be applied to the overlapped data. This is illustrated with respect to FIG. 5D, which plots the data shown in FIG. 5C, but overlapped into a single angle range corresponding to one period (i.e., the first period). Thus, the 20 periods of data (i.e., data from each section) plotted in FIG. 5C are plotted in the first $2\pi/20$ radian section. That is, the data from the second period is folded back into the first period, the data from the third period is folded back into the first period, etc. Thus, all 20 periods are represented by the data plotted in the first $2\pi/20$ radians. As illustrated, the data from the high periodicity spokes of the Siemens Star is centered at about 0.14 radians, with saturation of the sensor elements demonstrated at central portions of the curve.

Figure 5D:
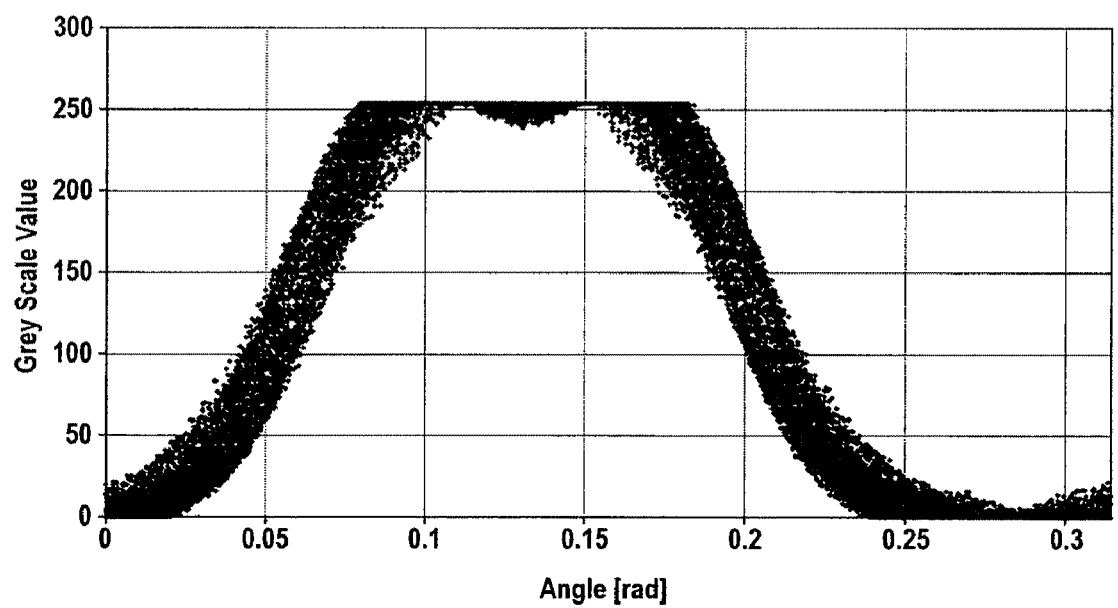
FIG. 5D illustrates the data shown in FIG. 5C, but overlapped into a single angle range corresponding to one period.
Figure 5E:
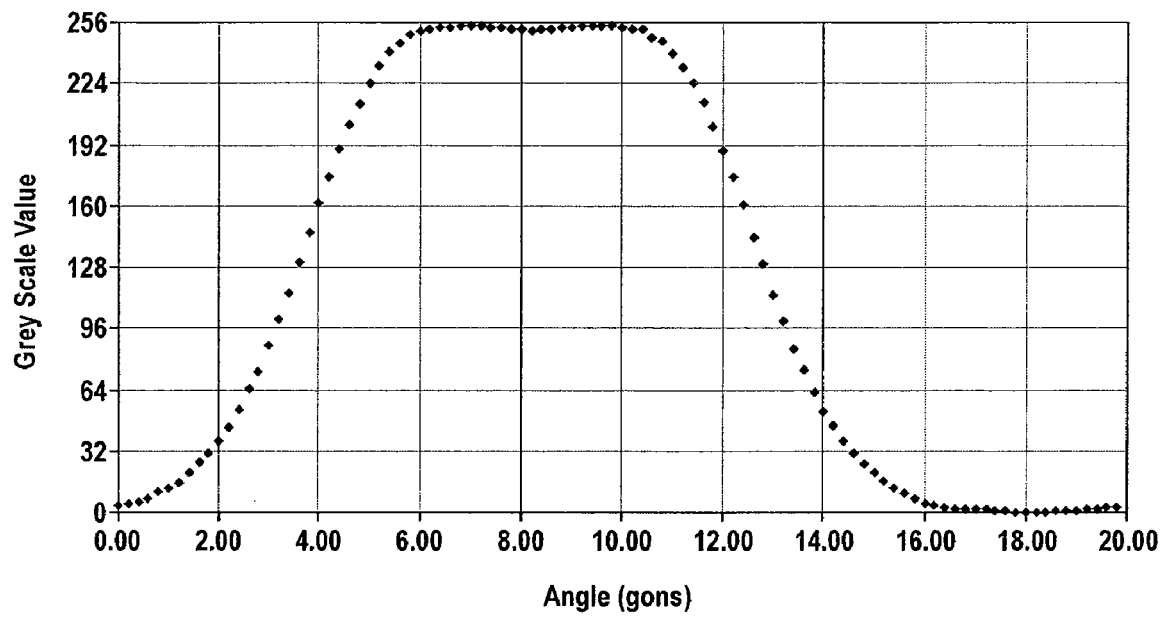
FIG. 5E illustrates averaged results based on the data shown in FIG. 5D.

FIG. 5E illustrates averaged results based on the data shown in FIG. 5D. The averaging is performed over subsegments of the chosen period illustrated in FIG. 5D. To compute the data illustrated in FIG. 5E, the gray scale values associated with sensor elements falling within each portion of the various sections was averaged. That is, each section (which are all overlapped into the first section) was divided into 100 portions as described throughout the present specification. For each portion, the sensor elements associated with angles in the portion were averaged to get an average gray scale value for the portion. The averaged values for the 100 portions are illustrated in FIG. 5E. For purposes of clarity, the data is plotted in FIG. 5E in terms of angle in gons. Since there are 20 periods in the Siemens Star, the overlapped data is plotted over a 20 gon range (i.e. $2\pi/20$ radian range). It is possible that asymmetric distortions can shift the phase determined using the methods described herein, however these distortions can be accounted for or removed in the analysis process when measuring relative angles.

Although the average values shown in FIG. 5E effectively average not only the data in each portion but also the 20 sections, this is not required by the present invention. In other embodiments, each of the sections can be treated individually and the sensor elements falling into the portions of the section can be averaged. The example discussed in relation to FIG. 5E is merely provided by way of example and is not intended to limit the scope of the present invention as a number of other computational methods can be utilized.

Thus, curve fitting of data extending over a single period, over multiple periods, over multiple periods overlapped into the first period, combinations thereof, or the like, are included within the scope of embodiments of the present invention. Typically, the system designer will trade off the complexity of the computations with the cost of the computational hardware to determine the particular methods utilized in a specific embodiment. One of ordinary skill in the art would recognize many variations, modifications, and alternatives.

The 100 average values plotted in FIG. 5E can be used as the input for a first-order Fourier analysis that produces the phase information of the first-order sinusoidal wave as a result. In this particular implementation, the fine angle is then equal to the resulting phase times 20 gon/$2\pi$. In embodiments that utilize 100 portions of a section and look up tables, computations are performed utilizing inexpensive components. In other embodiments, other techniques can be utilized depending on the computational components available. The inventors have determined that the use of one or more portions of a Siemens Star as a patterned member as illustrated throughout the present specification, enables the use of efficient and fast algorithms. However, rather than utilizing averaged values (either over sections and/or portions of sections), all gray scale values associated with original element angles can be used in a sinusoidal fitting calculation. Additionally, other patterns with other, sometimes more complicated, calculation algorithms can be used, typically providing more accurate results at the expense of more time per calculation and cost.

Figure 6A:
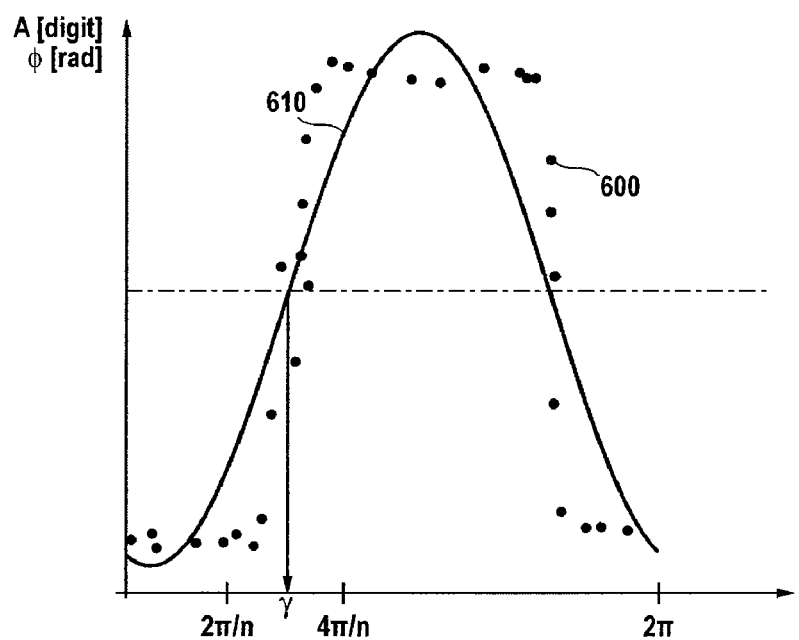
FIG. 6A is a simplified illustration of a second measurement waveform according to an embodiment of the present invention.

FIG. 6A is a simplified illustration of a second measurement waveform according to an embodiment of the present invention. The second measurement waveform illustrated in FIG. 6A represents the element intensity values measured in the inner region 440 located between the two inner dashed rings in FIG. 4A. That is, FIG. 6A is a representation of data collected and fit to the coarse measurement area of the patterned member. The dots, which represent measured element intensity values (or averages of element intensity values in a predetermined angular range) are plotted as a function of angle from zero to $2\pi$ radians. The number of dots, which is related to the angular resolution at which data is collected, can be the same as in FIG. 5A or less depending on the particular application.

It should be noted that sinusoidal nature of the measured data 600 and the sine wave 610 fit to the measured data represents a condition in which the image of the semicircles is blurred in the image plane. Typically, the measured data will form a pattern closer to a square wave, which may be processed to obtain a similar result. Additionally, edge detection algorithms may be utilized to extract the phase data from the measurement data.

The waveform 610 can be derived from the data in FIG. 6A and thereby, the coarse phase value γ. The coarse result provided by the analysis shown in FIG. 6A can then be used to resolve the ambiguities in phase discussed in relation to FIG. 5A. The best fit may be obtained by fitting a periodic shape, for example, a sine wave with a period $2\pi$, to different measurement values of the photosensitive elements. Then, the phase value γ is determined with respect to a reference position, i.e., a value given by the intersection of a circle of photosensitive elements used for the analysis and a predetermined reference direction, for example, given by the reference numeral 480 in FIG. 4A. A reference waveform may also be used to determine the zero position for determining the phase value γ.

It will be appreciated that although the phase shift of γ is illustrated in FIG. 6A, other reference directions can be utilized or other previously obtained waveforms can be utilized to determine the phase shift between the measurement data and the reference data. One of ordinary skill in the art would recognize many variations, modifications, and alternatives. Fourier transform techniques (e.g., FFT algorithms) can be utilized to determine the phase shift in a manner similar to that described in relation to FIG. 5A.

Figure 6B:
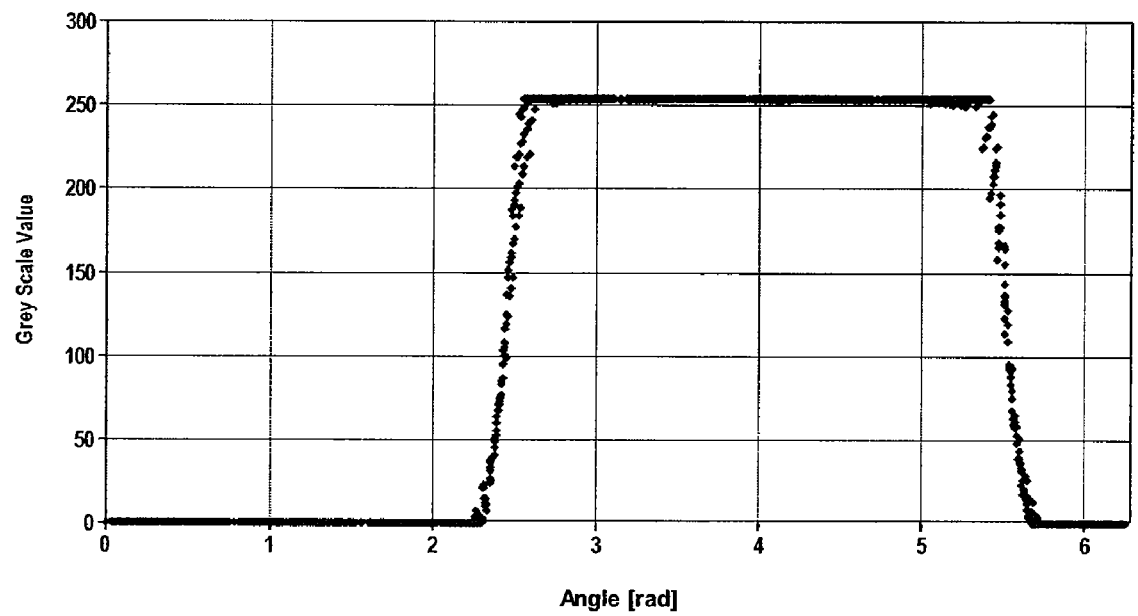
FIG. 6B illustrates coarse angular data collected using an angle measurement device according to an embodiment of the present invention.

FIG. 6B illustrates coarse data collected using an angle measurement device according to an embodiment of the present invention. The gray scale values of a number of the sensor elements is plotted as a function of angle in radians. For the plot shown in FIG. 6B, an annular ring covering a predetermined radial dimension associated with the low periodicity patterned member (e.g., a hemisphere) was utilized and the position of the pixel was converted to an angle with respect to a center point. At angles of less than about 2.2 radians, the intensity measured on the sensor is low, corresponding to an opaque portion of the patterned member. At angles greater than about 2.2 radians and less than about 5.6 radians, the intensity measured on the sensor is high, corresponding to a clear portion of the patterned member. The data plotted in FIG. 6B was not averaged, although averaging or other processing of data can be performed in other embodiments. The analysis of this coarse measurement range over the inner ring illustrated in FIG. 4A identifies a first phase shift that serves to identify which of the n segment pairs of the outer rings are the reference point for the fine phase shift measurement.

Figure 7:
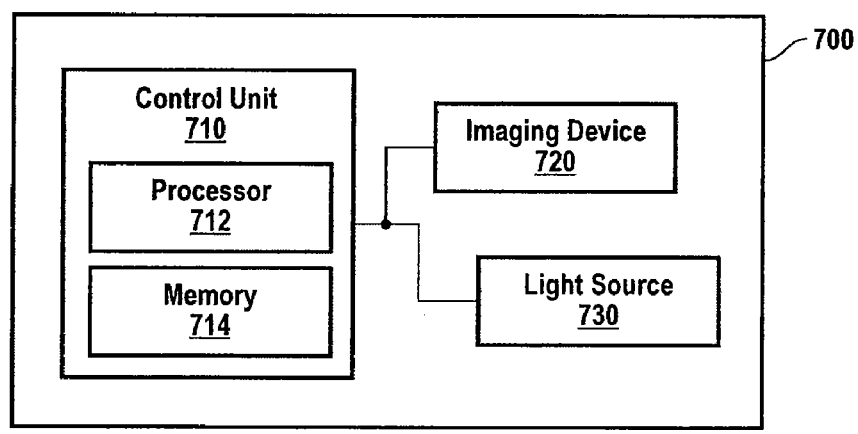
FIG. 7 is a simplified block diagram of an angle measurement device according to an embodiment of the present invention.

FIG. 7 is a simplified block diagram of an angle measurement device according to an embodiment of the present invention. The angle measurement device 700 includes a control unit 710 having a processor 712 and a memory 714, an imaging device 720, and a light source 730. The imaging device 720 may be any suitable imaging unit, such as the CCD array explained above. The light source 730 may be any suitable illumination unit, such as an LED, similar to the one described above. The control unit 710 may be realized by a micro processor, computer, field programmable gate array (FPGA) or integrated circuit, such as an ASIC (Application Specific Integrated Circuit) or software or any suitable combination of the above, but are not limited thereto. One of ordinary skill in the art would recognize many variations, modifications, and alternatives.

In the illustrated embodiment, the control unit 710 includes the processor 712 and the memory 714. The memory 714 may store a program providing instructions adapted to cause a data processor, such as processor 712, to carry out combinations of the above-mentioned operations. Therefore, the program stored in the memory 714, or only elements thereof, may easily be retrieved by the processor 712 for execution.

Moreover, a computer readable medium may be provided, in which the program is embodied. The computer readable medium may be tangible, such as a disk or other data carrier, or may be constituted by signals suitable for electronic, optical or any other type of transmission. A computer program product may comprise the computer readable medium. For example, the computer program may include instructions controlling the imaging device 720 and light source 730. For example, the control unit 710 may instruct the light source 730 to turn on the light or instruct a memory to read out measurement values of photosensitive elements of the imaging device 720. Further, once the control unit 710 instructs the memory or other suitable device to read out measurement values for photosensitive elements, these measurement values may be transferred and processed in the processor 712 to determine the rotation angle, as discussed above. Therefore, the control unit 710 may include the functions performed by the angle determination unit 150, which has been explained above. However, the angle determination unit may also constitute a separate unit connected to the control unit 710. One of ordinary skill in the art would recognize many variations, modifications, and alternatives.

Figure 8A:
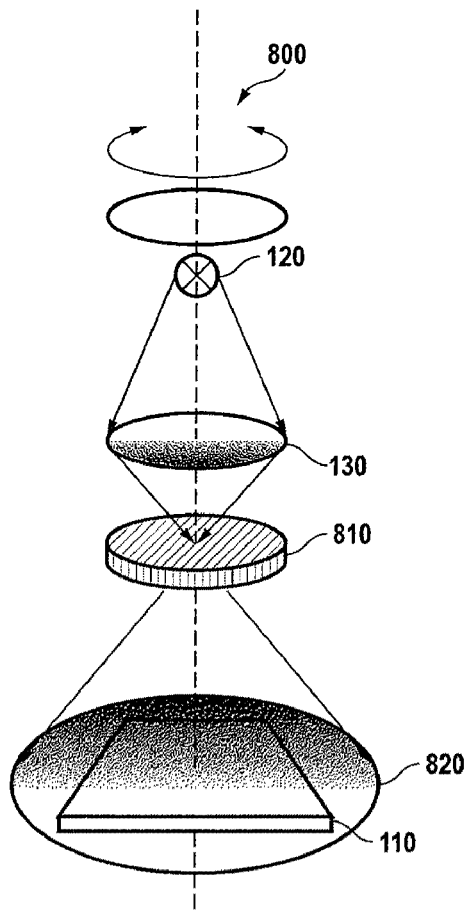
FIGS. 8A and 8B illustrate two examples of periodic patterns useful with angle measurement devices according to an embodiment of the present invention.
Figure 8B:
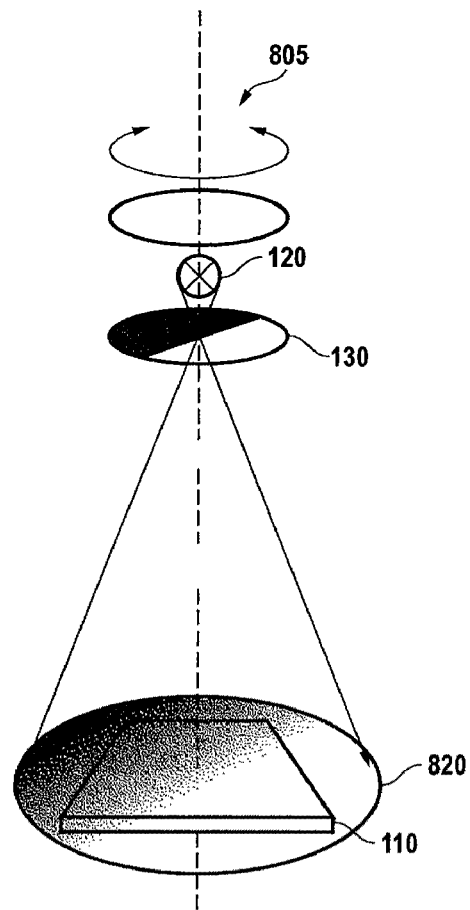

FIGS. 8A and 8B illustrate two examples of other periodic patterns useful with angle measurement devices according to an embodiment of the present invention. FIGS. 8A and 8B provide further illustration of the various possible patterns, generation of images of those patterns on an imaging device, and the analysis thereof. Referring to FIG. 8A, the angle measurement device 800 includes a light source (e.g., an illumination unit) 120, the patterned member 130, a lens 810 and an image 820 formed on the imaging device 110. Further, the pattern of the patterned member is shown in plan view by reference numeral 850 and an analysis of this image is shown below, where reference numeral 870 denotes the measured angle, reference numeral 880 denotes an area of photosensitive elements used by the angle measurement device and reference numeral 890 denotes a calculated center of weight of received intensities. In some embodiments, a gray scale distribution is utilized in which shading from a maximum value to a minimum value is provided from one side to another. In another embodiment, the maximum to minimum shading is provided on a circular member.

The angle measurement device 805 illustrated in FIG. 8B is similar to the angle measurement device 800, but does not include lens 810. Additionally, the patterned member 130 utilizes a different pattern from that used in the angle measurement device 800. The patterned member 130 shown in FIG. 8B is shown in plan view by reference numeral 860. Below the pattern 860, an analysis of the image of the patterned member 130 is shown. It should be noted that the pattern 850 constitutes a periodic pattern as described herein, since it includes two semicircles, with the edge between the two semicircles being totally blurred.

Plotting the measurement values of a sequence of photosensitive elements in a circumferential direction around the center of the imaging unit 110 in FIG. 8A or 8B results in a waveform, similar to the second waveform described with respect to FIG. 8A. Therefore, the patterns 850 and 860 are periodic patterns and lead to a periodic function, such as a sinusoidal function as shown in FIG. 8A.

Referring once again to FIG. 8A, the light source 120 illuminates the patterned member 130, which results in a gray wedge being projected by the lens 810 onto the imaging device 110. The photosensitive elements used for determining the rotation angle may be all of the elements in the area within the circle designated by reference numeral 880. Alternatively, elements outside the circle designated by reference numeral 880, a subset of these elements, or the like may be utilized. Here, the center of weight of the received intensity may be calculated, which is shown by the reference numeral 890. The line between the center of weight 890 and the origin of the circle defines the direction of the rotation and thus the rotation angle 870.

The same analysis may be applied to FIG. 8B, which is different from FIG. 8A in that the gray distribution on the imaging unit is generated differently. The pattern 860, which has an exactly defined edge, may be projected onto the imaging device 110 to form a blurred image of the edge by using a larger light source or other suitable methods. Therefore, similar gray distributions in FIGS. 8A and 8B may be obtained by different patterns 850 and 860 depending on the optics and light source and their distances with respect to each other. Consequently, the above discussed advantages may also be achieved with the angle measurement devices discussed throughout the present specification as a large amount of sampling points from the imaging device are utilized to compute a measurement waveform useful for accurate phase shift determination.

As illustrated in FIG. 8A and FIG. 8B, embodiments provide gray scale patterns. These gray scale values can be mapped to the elements that are associated with an angle of interest. In one embodiment discussed previously, the elements falling within an angular range of 0.18° are grouped together and can be averaged to determine an average gray scale value for the particular angular range. Other angular ranges can be utilized in alternative embodiments.

Figure 9A:
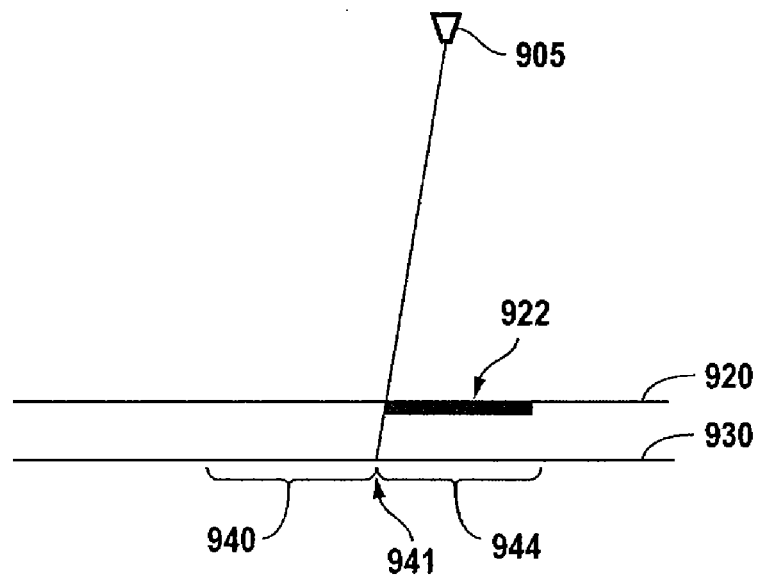
FIG. 9A is a simplified illustration of light shadow effects according to an embodiment of the present invention.

FIG. 9A is a simplified illustration of light shadow effects according to an embodiment of the present invention. As illustrated in FIG. 9A, a point source 905 generates light propagating toward the opaque area 922 on the patterned member 920. The region to the left of the opaque area 922 is transparent in this embodiment. Light from the light source passes by the left edge of the opaque area 922 on the patterned member 920. For purposes of clarity, only a single segment is illustrated in FIG. 9A. Because of the narrow angular divergence of the light from the light source 905, a narrow gray region 941 is formed on the imaging device 930 between the high illumination region 940 and the shadow or low illumination region 944. In this geometrical optics analysis, the effects of diffraction, roughness of the edge of the opaque area, and the like, are not considered. Depending on the optical configuration, the extent of the gray region 941 between bright and dark regions will vary. As will be evident to one of skill in the art, additional optics may result in additional blurring of the "image" of the edge of the opaque area on the detector array.

Figure 9B:
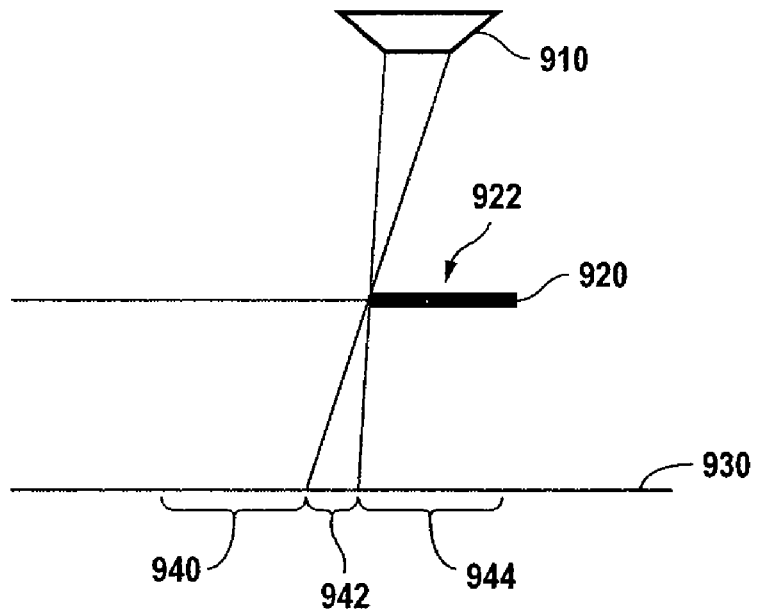
FIG. 9B is a simplified illustration of light shadow effects according to another embodiment of the present invention.

FIG. 9B is a simplified illustration of light shadow effects according to another embodiment of the present invention. As illustrated in FIG. 9B, an extended source 910 generates light propagating at a number of angles. Light from the left side of the light source passes by the left edge of the opaque area 922 on the patterned member 920. For purposes of clarity, only a single segment is illustrated in FIG. 9B. Additionally, light from the right side of the light source passes by the left edge of the opaque area on the patterned member. Because of the angular divergence of the light from the light source, an extended gray region 942 is formed on the imaging device 930 between the high illumination region 940 and the shadow or low illumination region 944. In this geometrical optics analysis, the effects of diffraction, roughness of the edge of the opaque area, and the like, are not considered. Depending on the optical configuration, the extent of the gray region 942 between bright and dark regions will vary. As will be evident to one of skill in the art, additional optics may result in additional blurring of the "image" of the edge of the opaque area on the detector array. It should be noted that reflective designs such as the one illustrated in FIG. 1B will provide similar gray regions between bright and dark regions based on the similarity of the geometrical optics effects illustrated in FIG. 9A and FIG. 9B.

Figure 10:
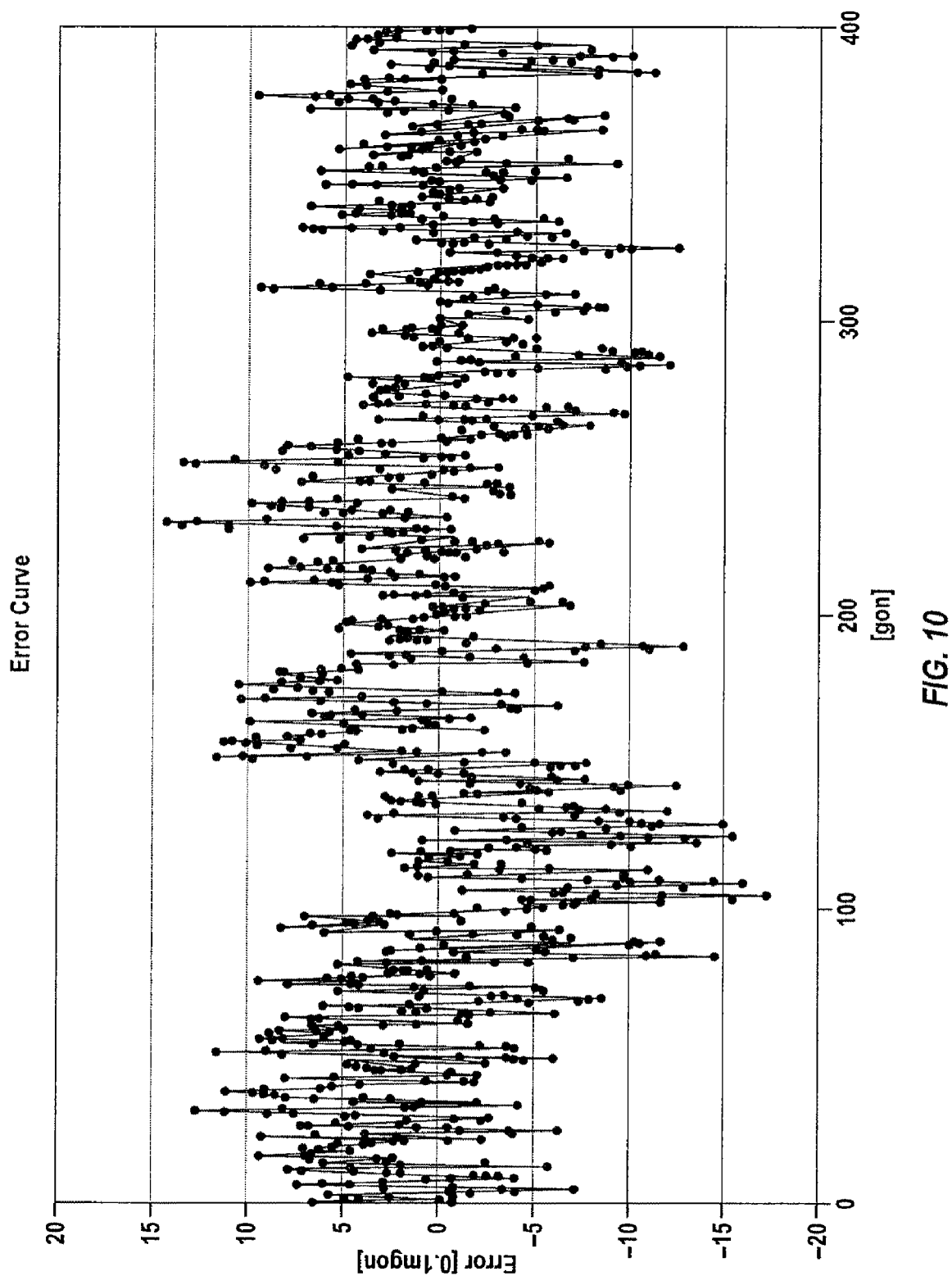
FIG. 10 is an uncorrected error curve measured according to an embodiment of the present invention.

FIG. 10 is an uncorrected error curve measured according to an embodiment of the present invention. To collect the data illustrated in FIG. 10, a calibrated source was rotated and the measurements provided by the calibrated source and an embodiment of the present invention were compared. The error between the measurements provided by the embodiment of the present invention and the calibrated source are plotted over a range of 360° (400 gons) in FIG. 10. The error (measured in 0.1 milligons) is less than about 0.6 mgons, which corresponds to about 2" or error. Thus, FIG. 10 illustrates that a small, compact, and inexpensive angle measurement device can provide high accuracy results. Applications for the angle measurement device described herein include surveying instruments, machine control devices, rotating robotic arms, other mechanical devices utilizing precise angle measurements, and the like.

Figure 11:
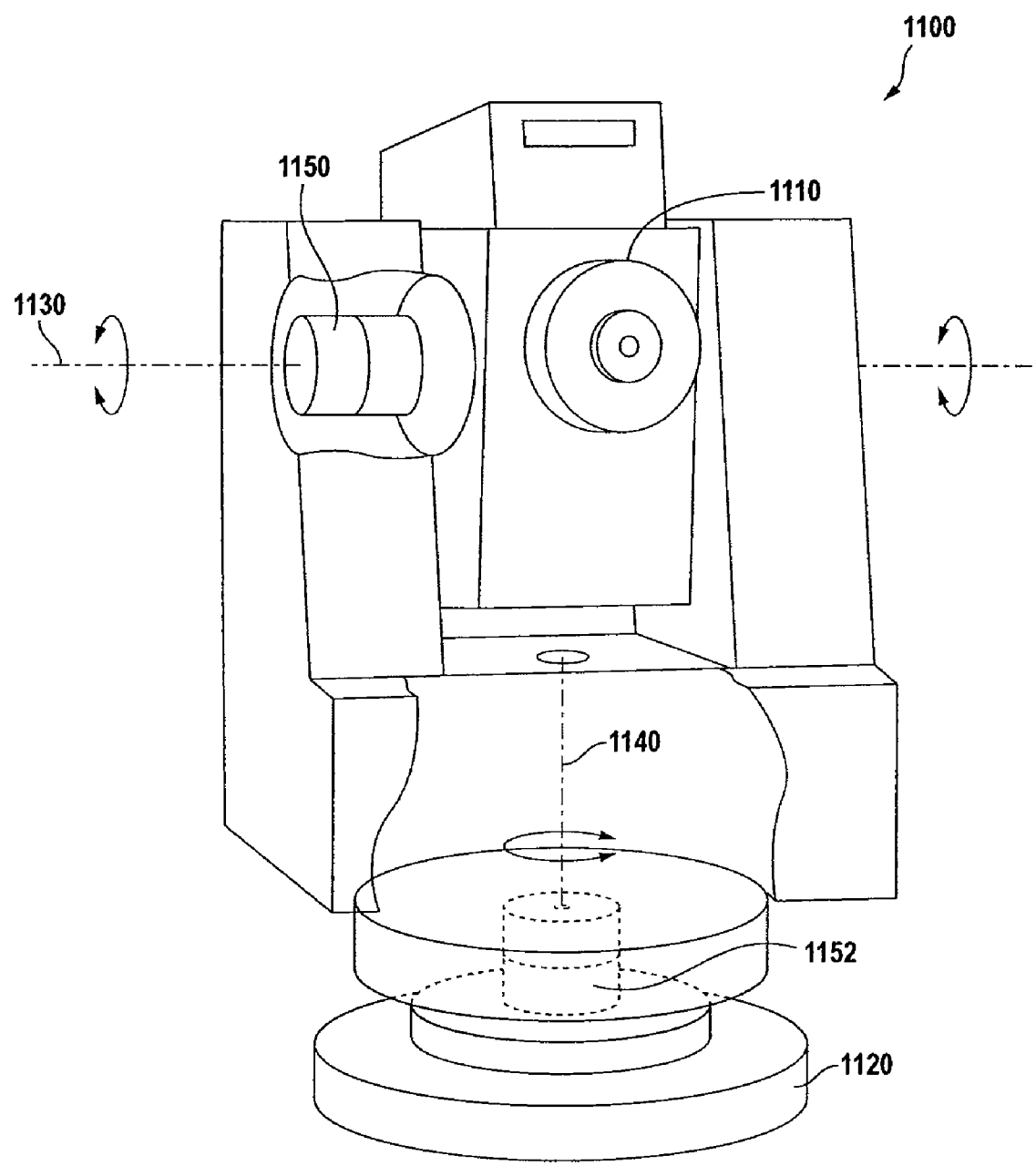
FIG. 11 is a schematic representation of a Total Station surveying instrument that incorporates two of the angle sensors described herein.

FIG. 11 is a schematic representation of a Total Station surveying instrument that incorporates two of the angle sensors described herein. The Total Station 1100 includes a telescope and electronic distance measuring system 1110. Additional description related to the telescope and electronic distance measuring system are provided in International Publication No. WO 2004/027349 A1 and U.S. Patent Application Publication No. 2007/0180716 A1, which are commonly assigned and hereby incorporated by reference in their entirety for all purposes. A mounting bracket 1120 is provided to secure the Total Station to a suitable stable platform. The Total Station is able to rotate about at least a horizontal rotation axis 1130 and a vertical rotation axis 1140. Angle measurement devices according to embodiments of the present invention (also referred to as an angle encoder) are provided at locations associated with both the horizontal rotation axis 1130 and the vertical rotation axis 1140. In a particular embodiment, an angle measurement device 1150 is centered on the horizontal rotation axis and a second angle measurement device 1152 is centered on the vertical rotation axis. As discussed previously, calibration of the angle measurement devices to account for displacement from the center of rotation may be performed.

In an embodiment, the Total Station 1100 is calibrated by defining a zero rotation angle for the various rotation axes. Then, during operation, the angle encoders provide information on the angle of rotation of the Total Station during operation. An exemplary application is surveying, where the angle measurement devices provide real time data to the instrument during a survey. Although the angle determination unit has been illustrated in conjunction with the other elements of the angle measurement device, this is not required by the embodiment illustrated in FIG. 11 since the angle determination unit could be integrated into one or more processors already resident in the Total Station. One of ordinary skill in the art would recognize many variations, modifications, and alternatives.

As an example an angle measurement device as described herein may be included in a surveying instrument, such as a tacheometer video total station, to give information about the exact positioning angle of the optics, e.g. the telescope, of such a surveying instrument. Hereby, any of the previously discussed angle measurement devices may be incorporated in the surveying instrument which may be used in several applications, wherein the instrument is at a fixed position in the field, mounted on a vehicle at a construction site or similar location.

It should be understood that the operations described herein are not inherently related to any particular device or instrument and may be implemented by any suitable combination of components. One of ordinary skill in the art would recognize many variations, modifications, and alternatives.

Embodiments of the present invention have been described in relation to particular examples, which are intended to be illustrative and not restrictive. Those skilled in the art will appreciate that many different combinations of hardware, software, and firmware will be suitable for practicing embodiments of the present invention.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An angle measurement device comprising:
a light source configured to emit light along an optical path;
a patterned member positioned along the optical path and configured to rotate about an axis of rotation, wherein light passing through the patterned member provides a spatially modulated optical waveform;
an imaging device positioned along the optical path and including a plurality of photosensitive elements disposed in an array configuration, wherein the imaging device is configured to receive the spatially modulated optical waveform and provide a signal associated with light intensity at each of the plurality of photosensitive elements; and
an angle determination unit coupled to the imaging device and configured to compute a rotation angle of the patterned member based on a reference waveform and the provided signal.

2. The angle measurement device of claim 1 wherein the patterned member comprises a periodic optical variation.

3. The angle measurement device of claim 1 wherein the patterned member is fixed to a rotating mechanical support and the imaging device is fixed to a stationary mechanical support.

4. The angle measurement device of claim 1 wherein the light source comprises an LED.

5. The angle measurement device of claim 1 wherein the light source is configured to rotate about the axis of rotation.

6. The angle measurement device of claim 1 wherein the patterned member comprises a glass member.

7. The angle measurement device of claim 1 wherein the periodic optical variation comprises a variation in at least one of transmission of light through or reflection of light from the patterned member.

8. The angle measurement device of claim 7 wherein the variation in transmission is associated with an optically opaque material disposed on a surface of the patterned member.

9. The angle measurement device of claim 7 wherein the variation in reflection is associated with an optically opaque material disposed on a surface of the patterned member.

10. The angle measurement device of claim 9 wherein the light source and the imaging device are provided as an integrated component with the light source positioned in a central region of the imaging device.

11. The angle measurement device of claim 8 the optically opaque material comprises at least one of chrome, silver, aluminum, or ink.

12. The angle measurement device of claim 1 wherein the periodic optical variation includes a plurality of rotationally symmetric elements.

13. The angle measurement device of claim 1 wherein the axis of rotation is aligned to a center of rotational symmetry of the patterned member.

14. The angle measurement device of claim 1 wherein the patterned member is disposed perpendicular to the axis of rotation.

15. The angle measurement device of claim 1 wherein the imaging device comprises at least one of a CCD array or a CMOS optical sensor array.

16. The angle measurement device of claim 1 wherein the reference waveform comprises a periodic waveform computed as a function of light intensity captured by each of the plurality of photosensitive elements and associated with a reference position at which the patterned member and the imaging device are in a predetermined mechanical arrangement.

17. The angle measurement device of claim 1 wherein computing the rotation angle is based on a phase shift between the reference waveform and the spatially modulated optical waveform determined after a rotation of the patterned member with respect to the imaging device.

18. The angle measurement system of claim 1 wherein the patterned member comprises a non-periodic pattern.

19. The angle measurement device of claim 1 wherein the patterned member comprises:
a coarse measurement section having a predetermined number of first radially symmetric segments, each of the first radially symmetric segments having different optical properties; and
a fine measurement section having a second predetermined number of second radially symmetric segment pairs, wherein the second predetermined number is greater than the predetermined number.

20. The angle measurement device of claim 19 wherein the first radially symmetric segments comprises an opaque semicircle and a transparent semicircle and the second radially symmetric segment pairs comprise 20 pairs of portions of Siemens Star segments.

21. A method of determining a rotation angle, the method comprising:
illuminating at least a portion of a patterned member with an optical beam;
transmitting at least a portion of the optical beam through the patterned member;
projecting at least a portion of the transmitted beam onto an imaging device having a plurality of photosensitive elements disposed in an array configuration;
determining a first set of element signal values for each of at least a first subset of the plurality of elements;
computing a reference waveform using the determined first set of element signal values;
rotating the patterned member;
determining a second set of element signal values for each of at least a second subset of the plurality of elements;
computing a measurement waveform using the determined second set of element signal values; and
determining the rotation angle as a function of the reference waveform and the measurement waveform.

22. The method of claim 21 wherein the patterned member comprises a glass substrate having a periodic optically opaque layer disposed thereon.

23. The method of claim 21 wherein the patterned member comprises a non-periodic pattern.

24. The method of claim 21 wherein the reference waveform is computed by:
defining a reference position for the patterned member;
illuminating at least a portion of the patterned member with the optical beam;
transmitting at least a portion of the optical beam through the patterned member;
projecting at least a portion of the transmitted beam onto the imaging unit; and determining element intensity values for each of the plurality of elements.

25. The method of claim 21 wherein computing the measurement waveform comprises:
storing the determined element signal values in a memory;
defining a predetermined angular dimension;
determining a first set of elements characterized by an angle between a reference angle and the predetermined angular dimension;
determining a second set of elements characterized by an angle between the predetermined angular dimension and twice the predetermined angular dimension;
defining a first portion of the measurement waveform based on the determined element signal values for the first set of elements;
defining a second portion of the measurement waveform based on the determined element signal values for the second set of elements.

26. The method of claim 25 wherein the patterned member comprises a plurality of pairs of radially symmetric elements, each of the elements of the plurality of pairs subtending an element angle and wherein the predetermined angular dimension is less than the element angle.

27. The method of claim 26 wherein the predetermined angular dimension is $1/100$ of the element angle.

28. The method of claim 21 wherein computing the measurement waveform comprises:
storing the determined element signal values in a memory;
analyzing the determined element signal values associated with a first pair of radially symmetric segments.

29. The method of claim 28 wherein computing the measurement waveform further comprises analyzing the determined element signal values associated with a second pair of radially symmetric segments, the second pair of radially symmetric segments being positioned 180° with respect to the first pair of radially symmetric segments.

30. The method of claim 29 wherein computing the measurement waveform further comprises analyzing the determined element signal values associated with a third pair of radially symmetric segments, the third pair of radially symmetric segments being positioned between the first pair and the second pair of radially symmetric segments.

31. The method of claim 21 wherein defining the first portion of the measurement waveform comprises averaging the determined element signal values for the first set of elements and defining the second portion of the measurement waveform comprises averaging the determined element signal values for the second set of elements.

32. The method of claim 21 further comprising:
determining sets of elements for multiples of the predetermined angular dimension; and
defining subsequent portions of the measurement waveform based on the determined element signal values for the sets of elements.

33. The method of claim 21 wherein determining the rotation angle comprises computing a phase shift between the reference waveform and the measurement waveform.

34. The method of claim 33 wherein computing the phase shift comprises performing a Fourier Transform of the reference waveform and performing a Fourier Transform of the measurement waveform.

35. The method of claim 34 wherein the Fourier Transform of the reference waveform is an FFT and the Fourier Transform of the measurement waveform is an FFT.

36. The method of claim 33 wherein computing the phase shift comprises using a waveform feature detection method.

37. The method of claim 21 wherein determining the rotation angle comprises:
storing the first set of element signal values in a spreadsheet;
storing the second set of element signal values in a second spreadsheet; and
pattern matching the first set of element signal values and the second set of element signal values.

\* \* \* \* \*